US010950123B2

(12) United States Patent
Nishioka et al.

(10) Patent No.: US 10,950,123 B2
(45) Date of Patent: Mar. 16, 2021

(54) TRAFFIC CONTROL SYSTEM, TRAFFIC INFORMATION OUTPUT DEVICE, TRAFFIC CONTROL METHOD, AND RECORDING MEDIUM

(71) Applicant: NEC Corporation, Tokyo (JP)

(72) Inventors: Itaru Nishioka, Tokyo (JP); Yuta Ashida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/461,925

(22) PCT Filed: Nov. 17, 2017

(86) PCT No.: PCT/JP2017/041395
§ 371 (c)(1),
(2) Date: May 17, 2019

(87) PCT Pub. No.: WO2018/097047
PCT Pub. Date: May 31, 2018

(65) Prior Publication Data
US 2019/0325743 A1 Oct. 24, 2019

(30) Foreign Application Priority Data

Nov. 25, 2016 (JP) .............................. JP2016-229056

(51) Int. Cl.
*G08G 1/01* (2006.01)
(52) U.S. Cl.
CPC .................................. *G08G 1/0145* (2013.01)
(58) Field of Classification Search
CPC .. G08G 1/0104; G08G 1/0112; G08G 1/0129; G08G 1/0141; G08G 1/0145; G01C 21/3492
See application file for complete search history.

(56) References Cited

U.S. PATENT DOCUMENTS

2017/0147989 A1* 5/2017 Onimaru .............. G08G 1/0129
2017/0309171 A1* 10/2017 Zhao ....................... G01S 19/13
(Continued)

FOREIGN PATENT DOCUMENTS

JP       2003-099832 A      4/2003
JP       2005-078116 A      3/2005
(Continued)

OTHER PUBLICATIONS

Takashi Oguchi et al., "Providing Effects of Traffic Information on Alternative Route Choice Behavior in Congested Traffic Condition," Infrastructure Planning Review, 2005, pp. 799-804, vol. 22, No. 4.
(Continued)

*Primary Examiner* — Orlando Bousono
(74) *Attorney, Agent, or Firm* — Sughrue Mion, PLLC

(57) ABSTRACT

Provided is a traffic control system being capable of maintaining service quality provided by a toll-way. A traffic control system 1 includes a prediction unit 210 and a control unit 230. The prediction unit 210 predicts a traffic state on one path among a plurality of paths from a first location to a second location. The control unit 230 controls, when the traffic state predicted on the one path does not satisfy a predetermined service level, distributed numbers of vehicles among the plurality of paths on the first location in such a way that the traffic state on the one path satisfies the predetermined service level.

8 Claims, 19 Drawing Sheets

(56) References Cited

U.S. PATENT DOCUMENTS

2018/0032928 A1* 2/2018 Li .................... G06Q 10/06
2019/0113914 A1* 4/2019 Abe ................... B60W 30/10

FOREIGN PATENT DOCUMENTS

| JP | 2008-009639 A | 1/2008 |
| JP | 2009-244031 A | 10/2009 |
| JP | 2013-196441 A | 9/2013 |

OTHER PUBLICATIONS

Ryohei Fujimaki et al., "The Most Advanced Data Mining of the Big Data Era," NEC Technical Journal, Sep. 2012, pp. 91-96 (7 pages), vol. 7, No. 2.

Riki Eto et al., "Fully-Automatic Bayesian Piecewise Sparse Linear Models," Proceedings of the 17th International Conference on Artificial Intelligence and Statistics (AISTATS), 2014, pp. 238-246.

Hiroshi Matsui et al., "A Study on Determining the Optimal Toll for Toll Road," Bulletin of Nagoya Institute of Technology, 1973, pp. 395-340, vol. 25.

Written Opinion of the International Searching Authority of PCT/JP2017/041395 dated Feb. 20, 2018.

International Search Report of PCT/JP2017/041395 dated Feb. 20, 2018.

* cited by examiner

Fig.4

LOCATION: X100

| DIFFERENCE OF PREDICTED TRAVELING TIMES [min] $\Delta T = TR1 - TR2$ | DIFFERENCE OF TOLLS [¥] $\Delta P = PR1 - PR2$ | DISTRIBUTION RATIO y |
|---|---|---|
| 20 | 150 | 0.3 |
| 0 | 0 | 0.5 |
| -10 | 0 | 0.7 |
| -20 | -100 | 0.8 |
| ... | ... | ... |

Fig.7

| LOCATION | TARGET SERVICE LEVEL (MINIMUM SPEED) |
|---|---|
| ⋮ | ⋮ |
| X10 | SL10 (50km/h) |
| X20 | SL20 (50km/h) |
| ⋮ | ⋮ |

Fig.14

| LOCATION: X100 | | |
|---|---|---|
| DIFFERENCE OF PREDICTED TRAVELING TIMES [min] $\Delta T = TR1-TR2$ | DIFFERENCE OF TOLLS [¥] $\Delta P = PR1-PR2$ | DISTRIBUTION RATIO |
| -10 | 500 | 0.5 |
| -20 | 600 | 0.4 |
| -30 | 700 | 0.3 |
| ⋮ | ⋮ | ⋮ |

Fig.15

| LOCATION | TARGET SERVICE LEVEL (MINIMUM SPEED) |
|---|---|
| ⋮ | ⋮ |
| X10 | SL10 (80km/h) |
| ⋮ | ⋮ |

Fig.18

| | | PREDICTED TRAFFIC STATE OF TOLL-WAY | |
|---|---|---|---|
| | | TARGET SERVICE LEVEL IS SATISFIED | TARGET SERVICE LEVEL IS NOT SATISFIED |
| PREDICTIVE TRAFFIC STATE OF FREEWAY | NO CONGESTION | TOLL IS REDUCED | TOLL IS RAISED |
| | CONGESTION | NORMAL TOLL | TOLL IS RAISED |

… # TRAFFIC CONTROL SYSTEM, TRAFFIC INFORMATION OUTPUT DEVICE, TRAFFIC CONTROL METHOD, AND RECORDING MEDIUM

CROSS REFERENCE TO RELATED APPLICATIONS

This application is a National Stage of International Application No. PCT/JP2017/041395 filed Nov. 17, 2017, claiming priority based on Japanese Patent Application No. 2016-229056 filed Nov. 25, 2016, the disclosures of which are incorporated herein in their entirety by reference.

TECHNICAL FIELD

The present invention relates to a traffic control system, a traffic information output device, a traffic control method, and a recording medium.

BACKGROUND ART

Traffic congestion is becoming particularly serious in urban areas where population growth is advancing. In most of the urban areas, toll-ways for avoiding and detouring the congested urban central part are provided. However, whether or not to actually utilize the detours depends on determination of drivers, and there is a strong tendency for each driver to select a shortest path. Thus, traffic dispersion by detours is not performed as expected, and unnecessary congestion is occurring. As a technique of easing such unnecessary congestion, there is disclosed a technique which guides vehicles to a detour by displaying current traffic states (congestion degrees, traveling times, and the like) of a main road and a detour, and discounts a passage toll of the detour. For example, PTL 1 describes a technique which discounts a passage toll depending on a congestion time, based on information on presence or absence of road congestion recorded by a traveling vehicle. PTL 2 describes a technique which compares congestion degrees of a main road and a bypass road, and presents a path through which it is possible to move from a current position of a vehicle in a shortest time. Moreover, PTL 3 describes a technique which presents conditions of a main road and a detour to a driver by using congestion information acquired by a traffic control system, and discounts a passage toll for a vehicle that selects a path avoiding congestion.

Note that, as a related technique, NPL 1 discloses an information providing method of suppressing hunting caused between two routes of an expressway. Moreover, as another related technique, NPL 2 and NPL 3 each disclose heterogeneous mixture learning technology which generates a predictive model for each group of data having the same pattern or regularity.

CITATION LIST

Patent Literature

[PTL 1] Japanese Patent Application Laid-Open Publication No. 2003-99832
[PTL 2] Japanese Patent Application Laid-Open Publication No. 2009-244031
[PTL 3] Japanese Patent Application Laid-Open Publication No. 2013-196441

Non Patent Literature

[NPL 1] Takashi Oguchi, et al. "The providing effect of traffic information on alternative path choice behavior in congested traffic condition", Infrastructure planning review 22, 2005, pp. 799 to 804
[NPL 2] Ryohei Fujimaki, Satoshi Morinaga, "The most advanced data mining of the big data era", NEC Technical Journal, Vol. 65, No. 2, 2012, pp. 81 to 85
[NPL 3] Riki Eto, et al., "Fully-Automatic Bayesian Piecewise Sparse Linear Models", Proceedings of the 17th International Conference on Artificial Intelligence and Statistics (AISTATS), 2014, pp. 238 to 246

SUMMARY OF INVENTION

Technical Problem

In the above-described techniques disclosed in PTLs 1 to 3, a current traffic state is presented, and a vehicle is guided in such a way that a road with less congestion is selected by changing a passage toll of a detour. However, as described in NPL 1, when a current traffic state is only reported, a driver sensitively responds to the congestion, a traffic volume flaps between selectable paths, and a traffic situation is not stabled. Moreover, vehicles continue to flow into a place causing the congestion until the congestion actually occurs, and the guidance as described above is performed after the congestion occurs.

Thus, service quality (minimum speed or the like) to be provided by a road significantly deteriorates. In this case, in a road providing a priority service to a particular vehicle, such as a high-occupancy vehicle (HOV) lane or a high-occupancy toll (HOT) lane in the U.S., service quality cannot be maintained, and road measures by these services are affected.

An example object of the present invention is to solve the above-described problem, and provide a traffic control system, a traffic information output device, a traffic control method, and a recording medium being capable of maintaining service quality provided by a toll-way.

Solution to Problem

A traffic control system according to an exemplary aspect of the present invention includes: prediction means for predicting a traffic state on one path among a plurality of paths from a first location to a second location; and control means for controlling, when the traffic state predicted on the one path does not satisfy a predetermined service level, distributed numbers of vehicles among the plurality of paths on the first location in such a way that the traffic state on the one path satisfies the predetermined service level.

A traffic information output device according to an exemplary aspect of the present invention includes: output means for receiving, from a control device which determines, when a traffic state predicted on one path among a plurality of paths from a first location to a second location does not satisfy a predetermined service level, a toll of the one path in such a way that the traffic state on the one path satisfies the predetermined service level, based on a sensitivity model representing a distribution ratio among the plurality of paths on the first location to a difference of predicted values of indexes related to traffic states and a difference of tolls among the plurality of paths, the toll of the one path and the predicted value of the index related to the traffic state of each of the plurality of paths, and outputting the received toll of the one path and predicted value of the index related to the traffic state of each of the plurality of paths.

A traffic control method according to an exemplary aspect of the present invention includes: predicting a traffic state on one path among a plurality of paths from a first location to a second location; and controlling, when the traffic state predicted on the one path does not satisfy a predetermined service level, distributed numbers of vehicles among the plurality of paths on the first location in such a way that the traffic state on the one path satisfies the predetermined service level.

A computer readable storage medium according to an exemplary aspect of the present invention records thereon a program, causing a computer to perform a method including: predicting a traffic state on one path among a plurality of paths from a first location to a second location; and controlling, when the traffic state predicted on the one path does not satisfy a predetermined service level, distributed numbers of vehicles among the plurality of paths on the first location in such a way that the traffic state on the one path satisfies the predetermined service level.

Advantageous Effects of Invention

An advantageous effect of the present invention is that service quality provided by a toll-way can be maintained.

BRIEF DESCRIPTION OF DRAWINGS

FIG. 4 is a diagram illustrating an example of distribution information in the first example embodiment.

FIG. 7 is a diagram illustrating an example of a target service level in the first example embodiment.

FIG. 14 is a diagram illustrating an example of distribution information in the second example embodiment.

FIG. 15 is a diagram illustrating an example of a target service level in the second example embodiment.

FIG. 18 is a diagram illustrating a characteristic of toll setting of a toll-way by the distribution control processing in the second example embodiment.

EXAMPLE EMBODIMENT

Example embodiments of the present invention will be described in detail with reference to the drawings. Note that, the same reference sign is given to similar components in respective drawings and example embodiments, and descriptions are suitably omitted.

First, a traffic state and a service level in the example embodiments are described.

In the example embodiments, a flow rate, a traveling speed (hereinafter, also simply described as a speed), and vehicle density are used as indexes representing a traffic state of each location on a road network. A flow rate indicates the number of vehicles (the number of passing vehicles) passing a location per unit time. A speed indicates an average of speeds of a plurality of vehicles on a location. Vehicle density indicates a rate (space occupancy rate) at which each vehicle occupies a predetermined section including a location in terms of space, or a rate (time occupancy rate) at which each vehicle occupies a location in terms of time. The space occupancy rate and the time occupancy rate can be interconverted. In the example embodiments, the space occupancy rate is used as vehicle density.

Furthermore, on a road network, a level of a service (hereinafter, also described as a service level or service quality) provided to users of the road by an administrator of the road is defined. The service level may be defined by an index related to a traffic state on a particular location or in a particular section on the road network, such as the minimum speed, a traveling time, or the like. Moreover, the service level may be defined by an operation ratio of the road, a time of regulation or blockage due to an accident or construction (however, regulation or blockage due to bad weather is excluded), accuracy of a reported traveling time, a delay time of a congestion report, or a waiting time in a service area or a parking area. For each of these service levels, a level to be provided to users of the road by an administrator of the road (hereinafter, also described as a target service level or a predetermined service level) is defined. Note that the target service level may be, for example, a service level being prescribed by service level agreement (SLA) and being to be guaranteed for users of a toll-way by an administrator of the toll-way. Hereinafter, in the example embodiments, a case where the target service level is the minimum speed on a particular location of the toll-way is described as an example.

First Example Embodiment

Next, a first example embodiment is described.

First, a road network to be controlled in the first example embodiment is described. In the first example embodiment, the road network to be controlled is a road network of a toll-way in which a passage toll (hereinafter, also simply described as a toll) is collected, and is capable of traffic dispersion by a plurality of paths.

Figure 1:
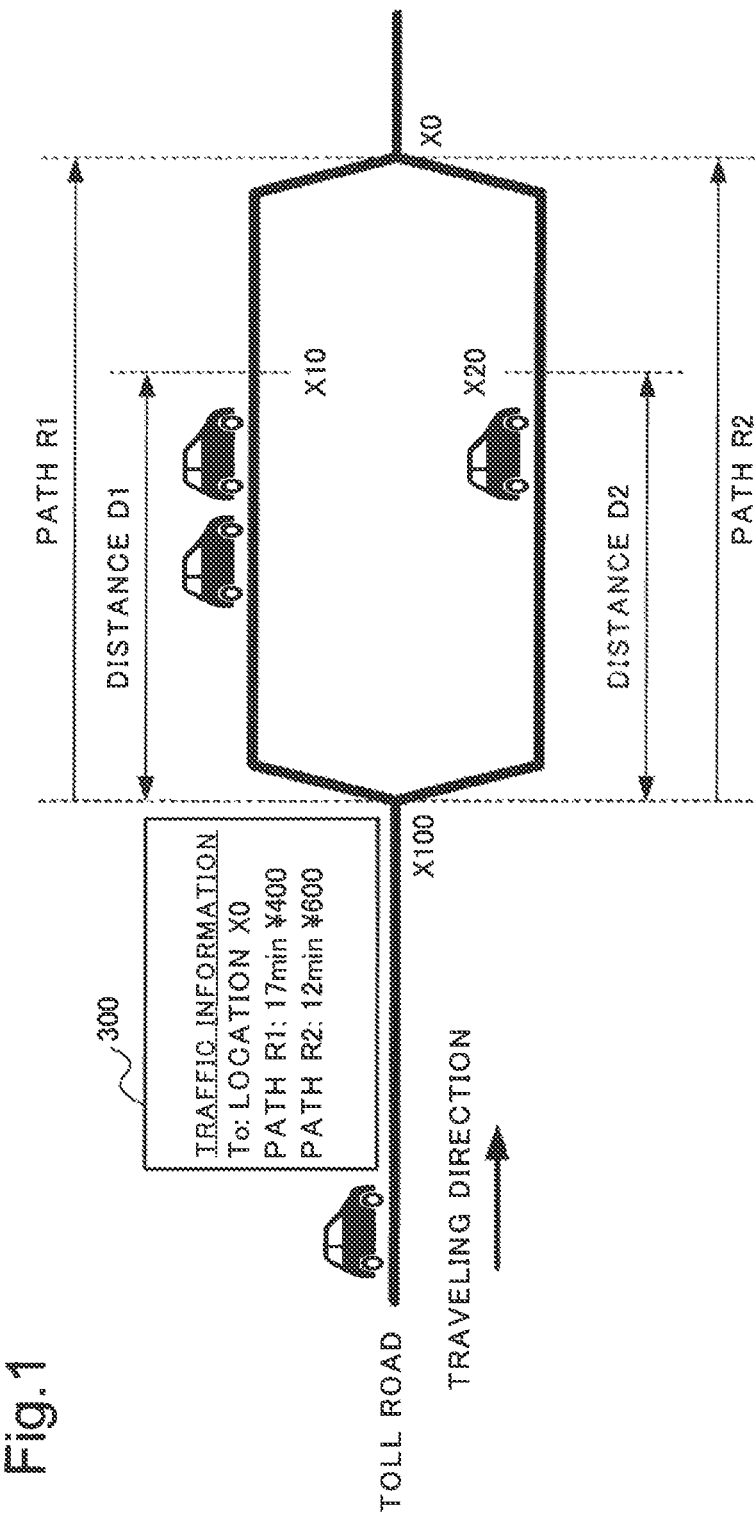
FIG. 1 is a diagram illustrating an example of a road network to be controlled in a first example embodiment.

FIG. 1 is a diagram illustrating an example of a road network to be controlled in the first example embodiment.

As illustrated in FIG. 1, a location Xi for which a traffic state is to be monitored (i=0, 1, . . . , Nx−1; Nx is the number of locations to be monitored) is defined on a road. On a location X100, a path R1 or path R2 is selectable as a path to reach a location X0. Hereinafter, the location X100 is also referred to as a distribution location. Moreover, different tolls are settable for the path R1 and the path R2. A traffic state in each path is also monitored on the location X100.

In the first example embodiment, a distribution ratio on the distribution location (the location X100) is controlled in such a way that a target service level is satisfied on both paths. The distribution ratio is, for example, a ratio of the number of vehicles selecting one path, to the total number of passing vehicles on the distribution location. The distribution ratio may be a ratio of a flow rate in one path, to a total of flow rates on the distribution location. In the first example embodiment, the distribution ratio is controlled by changing a difference of tolls between paths.

Figure 2:
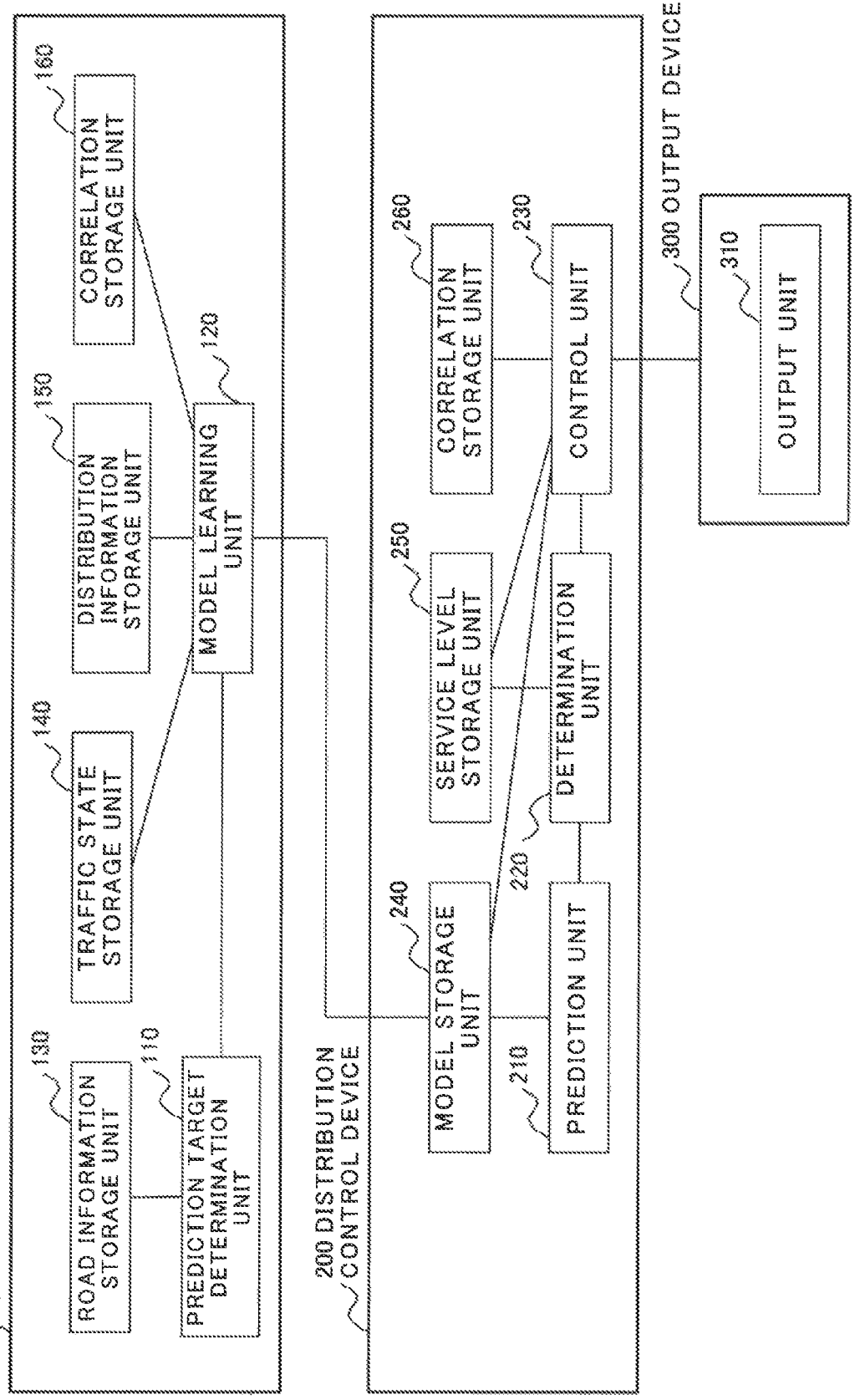
FIG. 2 is a block diagram illustrating a configuration of a traffic control system 1 in the first example embodiment.

Next, a configuration according to the first example embodiment is described. FIG. 2 is a block diagram illustrating a configuration of a traffic control system 1 in the first example embodiment.

The traffic control system 1 includes a learning device 100, a distribution control device 200, and an output device 300 (hereinafter, also described as a traffic information output device). The learning device 100, the distribution control device 200, and the output device 300 are interconnected by a network or the like. The output device 300 is, for example, a variable message sign (VMS), and is placed on a distribution location, or in front of the distribution location in a traveling direction. Moreover, the output device 300 may be an in-vehicle terminal device such as a car navigation device.

The learning device 100 generates a predictive model of a traffic state, and a sensitivity model of a distribution ratio. The predictive model is a model for predicting a traffic state. The sensitivity model is a model representing a sensitivity of a distribution ratio to a difference of predicted values of indexes related to traffic states and a difference of tolls, between respective paths. In the example embodiments, a predicted value of a traveling time (hereinafter, also described as a predicted traveling time) of each path is used as a predicted value of an index related to a traffic state of each path.

The distribution control device 200 predicts a traffic state of each path by use of the predictive model, determines a distribution ratio in such a way that a traffic state of each path satisfies a target service level, and determines, by use of the sensitivity model, a toll of each path to achieve the distribution ratio.

The output device 300 outputs (displays) traffic information to users of the road network (e.g., a driver or a passenger of a vehicle on the road network). The traffic information includes, for each path, a predicted value of an index related to a traffic state (predicted traveling time) and a toll.

The learning device 100 includes a prediction target determination unit 110, a model learning unit 120, a road information storage unit 130, a traffic state storage unit 140, a distribution information storage unit 150, and a correlation storage unit 160.

The road information storage unit 130 stores a road map indicating the road network, and road information indicating a speed limit of each location or each section on the road network.

The traffic state storage unit 140 stores a history of measured values of traffic states in the past on each location on the road network. The measured values of traffic states are collected by, for example, a traffic state collecting device (not illustrated). The traffic state collecting device collects the measured values of traffic states from sensors placed on respective locations on the road network at a predetermined collection interval.

Figure 3:
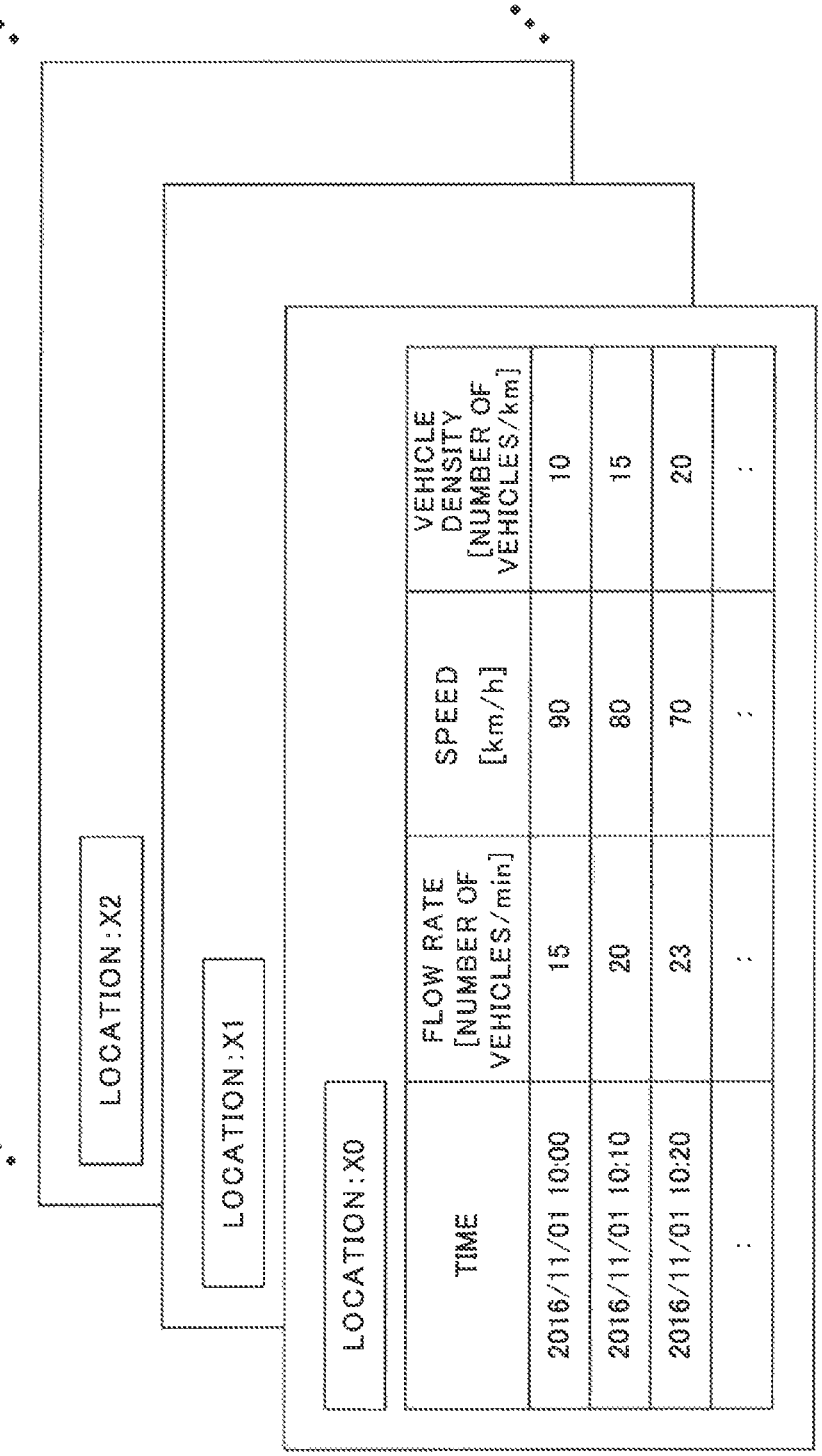
FIG. 3 is a diagram illustrating an example of traffic states in the first example embodiment.

FIG. 3 is a diagram illustrating an example of traffic states in the first example embodiment. In the example of FIG. 3, measured values of a flow rate, a speed, and vehicle density on each location Xi are collected as traffic states.

The distribution information storage unit 150 stores distribution information. The distribution information indicates a history of relations between "a difference of predicted traveling times and a difference of tolls, between respective paths, output by the output device 300 in the past" and "a distribution ratio observed at a time of outputting the predicted traveling times and tolls, or within a predetermined time from output thereof". The distribution information is collected by, for example, a distribution information collecting device (not illustrated). The distribution information collecting device collects, from the output device 300 at a predetermined collection interval, a predicted traveling time and a toll of each path that are output (displayed), and also collects, from a sensor placed on the distribution location, a flow rate of traffic flow distributed to each path. The distribution information collecting device generates the distribution information by calculating a difference of predicted traveling times and a difference of tolls from the collected predicted traveling times and tolls, respectively, and calculating a distribution ratio from the collected flow rates.

FIG. 4 is a diagram illustrating an example of the distribution information in the first example embodiment. In the example of FIG. 4, a difference of predicted traveling times ΔT, a difference of tolls ΔP, and a distribution ratio y are collected as distribution information for the distribution location X100. Herein, the difference of predicted traveling times ΔT is represented by, for example, ΔT=TR1−TR2 (TR1 and TR2 are predicted traveling times of the paths R1 and R2, respectively). The difference of tolls ΔP is represented by, for example, ΔP=PR1−PR2 (PR1 and PR2 are tolls of the paths R1 and R2, respectively). Moreover, the distribution ratio is, for example, a ratio of a flow rate of the path R1 when a total flow rate is 1.

The correlation storage unit 160 stores correlations between indexes (a flow rate, a traveling speed, and vehicle density) representing traffic states.

Figure 5:
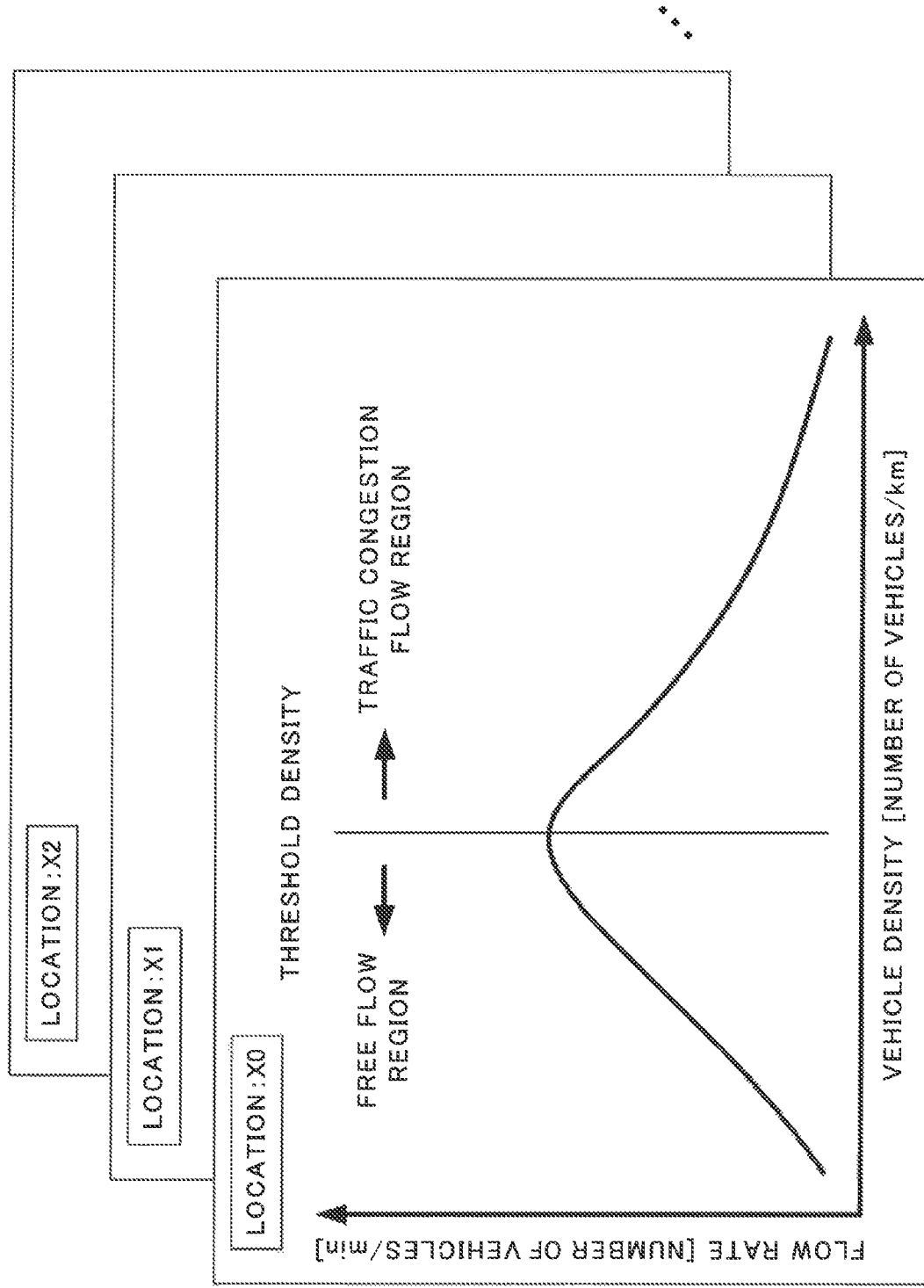
FIG. 5 is a diagram illustrating an example of a correlation between vehicle density and a flow rate in the first example embodiment.
Figure 6:
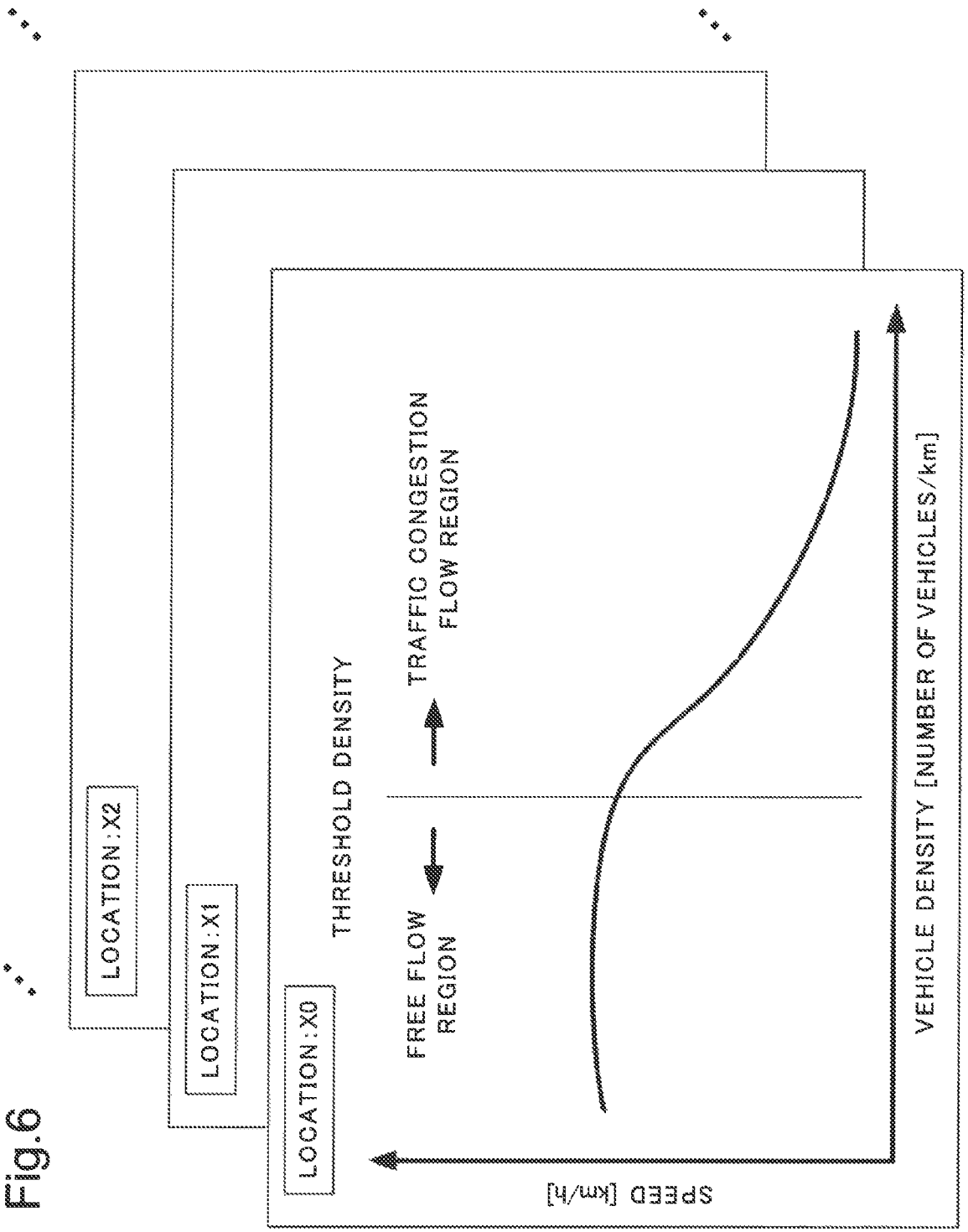
FIG. 6 is a diagram illustrating an example of a correlation between vehicle density and a speed in the first example embodiment.

FIG. 5 is a diagram illustrating an example of a correlation between vehicle density and a flow rate in the first example embodiment. FIG. 6 is a diagram illustrating an example of a correlation between vehicle density and a speed in the first example embodiment.

Generally, as illustrated in FIG. 5, in a region where vehicle density is equal to or less than threshold density, a flow rate also increases along with increase of the vehicle density, and vehicles can travel smoothly. Therefore, the region being equal to or less than the threshold density is called a free flow region. On the other hand, in a region where the vehicle density is more than the threshold density, the flow rate decreases along with increase of the vehicle density, and vehicles cannot travel smoothly. Thus, the region being more than the threshold density is called a traffic congestion flow region. Similarly, as illustrated in FIG. 6, in a region where the vehicle density is equal to or less than threshold density, a speed is constant around a speed limit (free flow region). However, when the vehicle density is more than the threshold density, vehicles become unable to travel freely along with increase of the vehicle density, and therefore, the speed greatly decreases (traffic congestion flow region).

In this way, there is a correlation among a flow rate, a speed, and vehicle density, and when one of these indexes is measured or estimated on each location on a road, another of the indexes can be estimated. Moreover, occurrence of congestion can be estimated by use of threshold density acquired from the correlation.

The correlation storage unit 160 stores the correlations as in FIGS. 5 and 6 for each location on the road network.

The prediction target determination unit 110 refers to the road map stored in the road information storage unit 130, and determines a location for which a traffic state is to be predicted (prediction target location) on each path, and a future time for which a traffic state is to be predicted (prediction target time) on the prediction target location.

The model learning unit 120 generates (learns) a predictive model for the prediction target location and the prediction target time, based on the traffic states in the past on each location stored in the traffic state storage unit 140. The model learning unit 120 also generates (learns) a sensitivity model, based on the distribution information stored in the distribution information storage unit 150.

The distribution control device 200 includes a prediction unit 210, a determination unit 220, a control unit 230, a model storage unit 240, a service level storage unit 250, and a correlation storage unit 260.

The model storage unit 240 stores the predictive model and the sensitivity model generated by the learning device 100.

The service level storage unit 250 stores a target service level for each location on the road.

FIG. 7 is a diagram illustrating an example of the target service level in the first example embodiment. In the example of FIG. 7, SL10 (minimum speed 50 km/h) and SL20 (minimum speed 50 km/h) are set as target service levels on locations X10 and X20.

The correlation storage unit 260 stores the correlation for each location on the road network, similarly to the correlation storage unit 160.

The prediction unit 210 predicts a traffic state at the prediction target time on the prediction target location, by applying a current traffic state on each location to the predictive model stored in the model storage unit 240.

The determination unit 220 determines whether or not a traffic state predicted (hereinafter, also described as a predicted traffic state) satisfies the target service level stored in the service level storage unit 250, on each of the prediction target locations of both paths.

When the target service level is not satisfied as a result of the determination, the control unit 230 determines a distribution ratio to satisfy the target service level on the prediction target location on each path. The control unit 230 also calculates a predicted traveling time for each path. Moreover, the control unit 230 determines a toll of each path to achieve the determined distribution ratio, by use of the sensitivity model stored in the model storage unit 240.

The output device 300 includes an output unit 310.

The output unit 310 outputs the traffic information received from the distribution control device 200.

Note that, each of the learning device 100, the distribution control device 200, and the output device 300 may be a computer including a central processing unit (CPU) and a storage medium storing a program, and operating by control based on a program.

Figure 8:
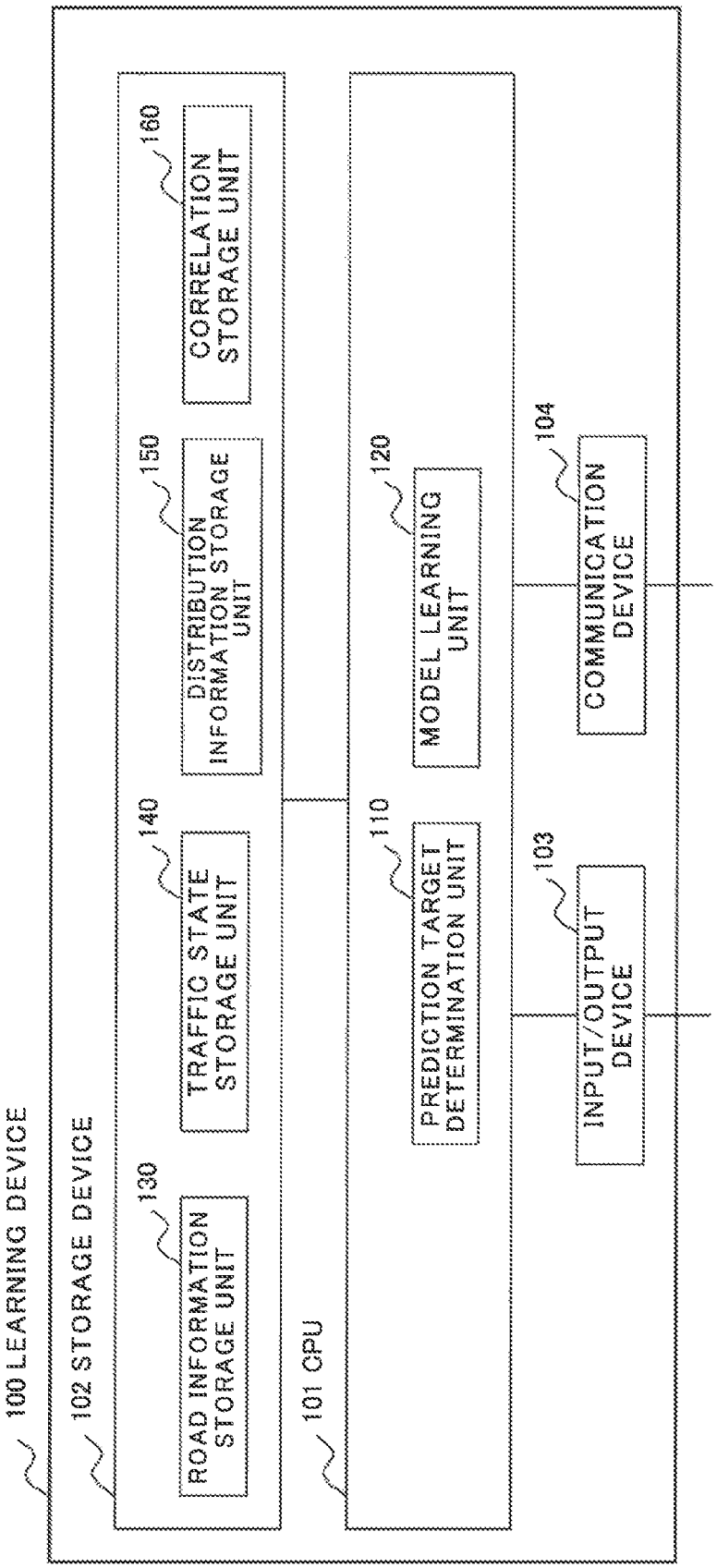
FIG. 8 is a block diagram illustrating a configuration of a learning device 100 implemented on a computer in the first example embodiment.
Figure 9:
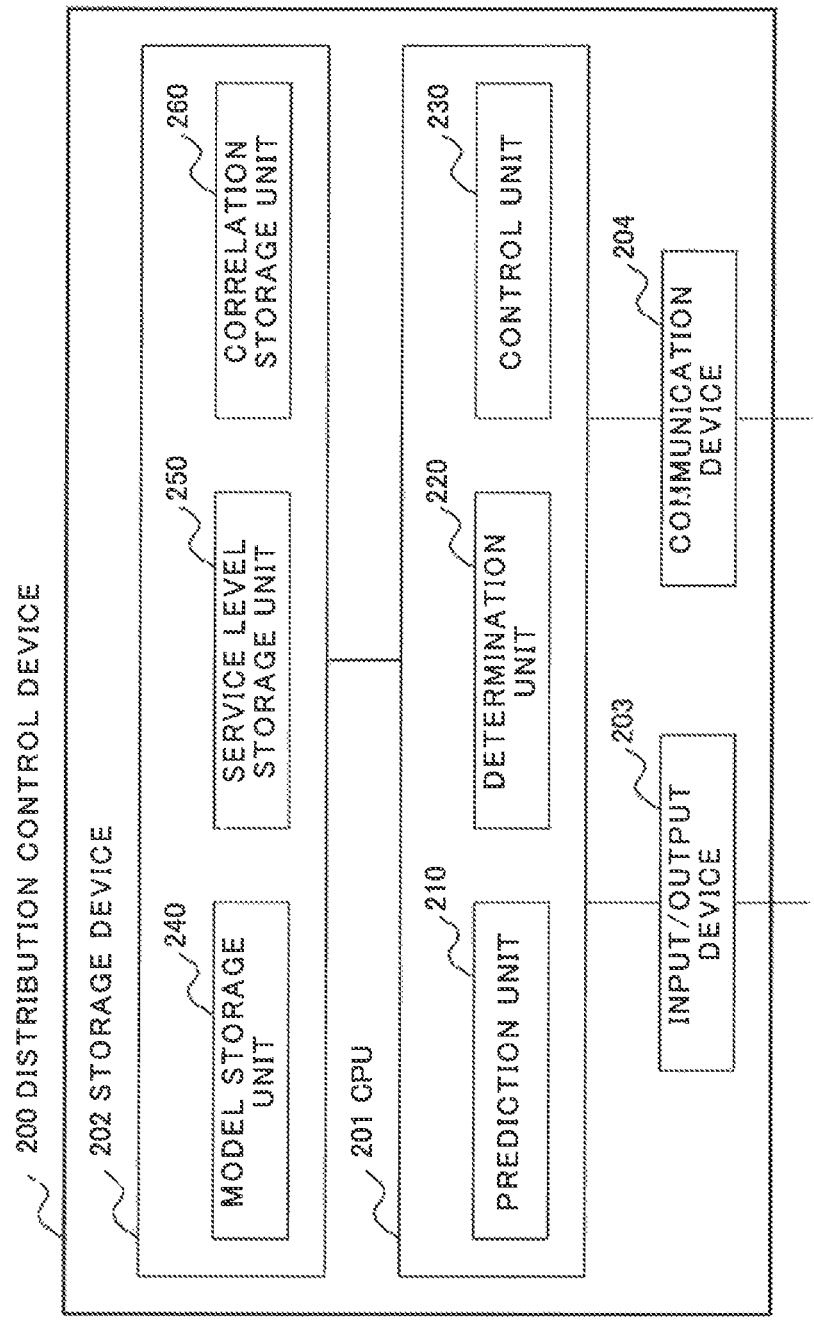
FIG. 9 is a block diagram illustrating a configuration of a distribution control device 200 implemented on a computer in the first example embodiment.

FIGS. 8 and 9 are block diagrams illustrating configurations of the learning device 100 and the distribution control device 200 implemented on a computer in the first example embodiment, respectively.

Referring to FIG. 8, the learning device 100 includes a CPU 101, a storage device 102 (storage medium), an input/output device 103, and a communication device 104. The CPU 101 executes a program for implementing the prediction target determination unit 110 and the model learning unit 120. The storage device 102 is, for example, a hard disk, a memory, or the like, and stores data of the road information storage unit 130, the traffic state storage unit 140, the distribution information storage unit 150, and the correlation storage unit 160. The input/output device 103 is, for example, a keyboard, a display, or the like, and accepts an execution instruction of learning from an administrator or the like. The communication device 104 receives measurement values of traffic states from the traffic state collecting device, and distribution information from the distribution information collecting device, respectively. The communication device 104 also transmits a predictive model and a sensitivity model to the distribution control device 200.

Referring to FIG. 9, the distribution control device 200 also includes a CPU 201, a storage device 202 (storage medium), an input/output device 203, and a communication device 204, similarly to the learning device 100. The CPU 201 executes a program for implementing the prediction unit 210, the determination unit 220, and the control unit 230. The storage device 202 stores data of the model storage unit 240, the service level storage unit 250, and the correlation storage unit 260. The input/output device 203 accepts an execution instruction of distribution control from the administrator or the like. The communication device 204 receives the predictive model and the sensitivity model from the learning device 100. The communication device 204 also transmits traffic information to the output device 300.

The output device 300 also includes a CPU, a storage device (storage medium), an input/output device, and a communication device, similarly to the learning device 100 and the distribution control device 200. The CPU executes a program for implementing the output unit 310. The communication device receives the traffic information from the distribution control device 200. The input/output device outputs (displays) the traffic information to users.

Furthermore, a part or all of the respective components of the learning device 100, the distribution control device 200, and the output device 300 may be implemented on a general-purpose or dedicated circuitry or processor, or a combination thereof. The circuitry or processor may be configured by a single chip, or a plurality of chips connected via a bus. Moreover, a part or all of the respective components of the learning device 100, the distribution control device 200, and the output device 300 may be implemented by a combination of the above-described circuitry or the like and a program.

When a part or all of the respective components of the learning device 100, the distribution control device 200, and the output device 300 are implemented on a plurality of information processing devices, pieces of circuitry, or the like, the plurality of information processing devices, pieces of circuitry, or the like may be arranged in a centralized manner or a distributed manner. For example, the plurality of information processing devices, pieces of circuitry, or the like may be implemented as a form in which the information processing devices, pieces of circuitry, or the like are connected with each other via a communication network, such as a client and server system, a cloud computing system, or the like.

Alternatively, a part or all of the learning device 100, the distribution control device 200, and the output device 300 may be configured by one device.

Next, the operation according to the first example embodiment is described.

<Learning Processing>

First, learning processing by the learning device 100 is described.

Figure 10:
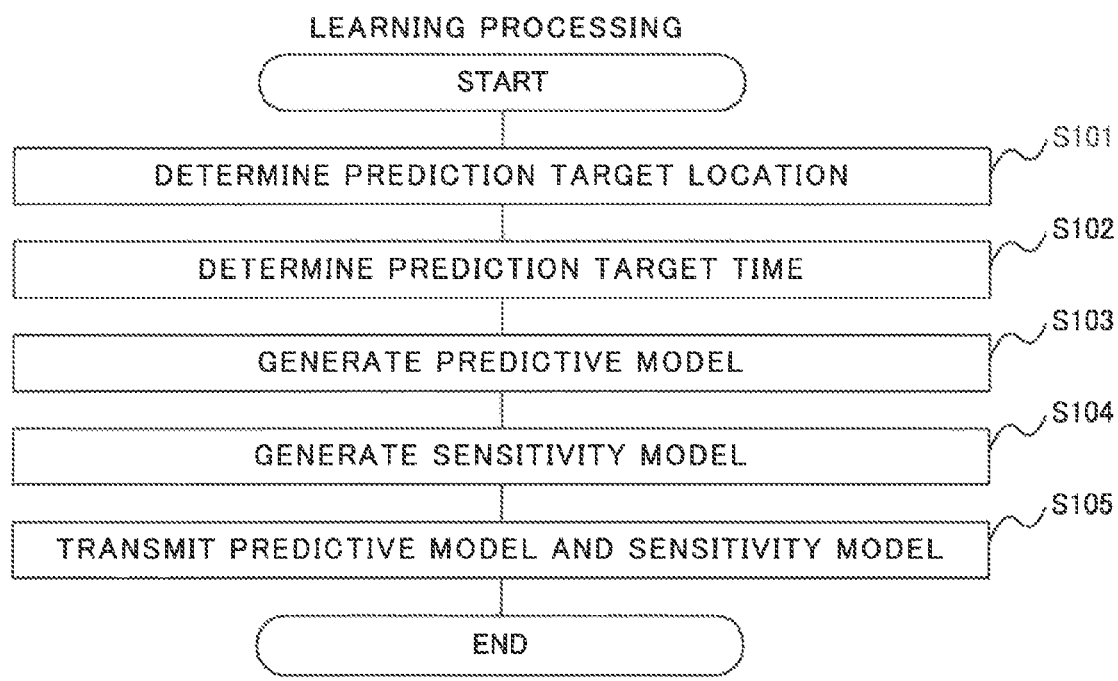
FIG. 10 is a flowchart illustrating learning processing in the first example embodiment.

FIG. 10 is a flowchart illustrating learning processing in the first example embodiment.

Herein, it is assumed that the road information of the road network in FIG. 1 is stored in the road information storage unit 130. It is also assumed that the traffic states in FIG. 3 and the distribution information in FIG. 4 are stored in the traffic state storage unit 140 and the distribution information storage unit 150, respectively.

First, the prediction target determination unit 110 of the learning device 100 determines a prediction target location (step S101). Herein, the prediction target determination unit 110 determines a prediction target location for each path selectable on a distribution location. For example, a location where congestion has frequently occurred in traffic states in the past or the like is used as the prediction target location. The prediction target location may be specified in advance by an administrator or the like.

For example, the prediction target determination unit 110 determines the locations X10 and X20 on the paths R1 and R2 in FIG. 1 as the prediction target locations.

The prediction target determination unit 110 determines a prediction target time (step S102). Herein, the prediction target determination unit 110 calculates, based on a distance between the distribution location and the prediction target location, and a speed limit, an arrival time from the distribution location to the prediction target location, and determines "a time when the arrival time has elapsed from the current time" as the prediction target time.

For example, for simplification, in FIG. 1, it is assumed that a distance D1 from the distribution location X100 to the prediction target location X10 is equal to a distance D2 from the distribution location X100 to the prediction target location X20 (D1=D2=D0), and speed limits of the paths R1 and R2 are also equal. In this case, the prediction target determination unit 110 calculates an arrival time T0 from the distribution location X100 to the prediction target locations X10 and X20, by use of the distance D0, and the speed limits of the paths R1 and R2, and determines "a time when the time T0 has elapsed from the current time" as the prediction target time.

The model learning unit 120 generates a predictive model (step S103). Herein, the model learning unit 120 generates the predictive model for the prediction target location and the prediction target time, based on the traffic states in the past on each location. The predictive model is generated by, for example, machine learning technology using the traffic states in the past on each location. In this case, the predictive model may be generated by use of the heterogeneous mixture learning technology disclosed in NPLs 2 and 3. Alternatively, the predictive model may be a general time-series model such as a linear regression model, an autoregressive model, or an autoregressive moving average model. The predictive model is generated for one or more of indexes representing the above-described traffic states (a flow rate, a speed, and vehicle density).

For example, a linear function of Equation 1 is used as the predictive model.

$$V'_{j,t+T0} = \sum_i a_{ij} V_{i,t} + b_{ij} \qquad \text{[Equation 1]}$$

Herein, t is a current time, t+T0 is a prediction target time, $V'_{j,t+T0}$ is a predicted value of a speed (hereinafter, also described as a predicted speed) at the prediction target time t+T0 on a prediction target location Xj (j=0, 1, . . . , and Nx-1), and $V_j$ is a speed at the current time t on each location Xi. Moreover, $a_{ij}$ is a coefficient indicating magnitude of a relationship between $V'_{j,t+T0}$ and $V_{i,t}$, and $b_{ij}$ is an intercept indicating a factor unrelated to a speed.

For example, the model learning unit 120 generates a predictive model as in Equation 1 for a speed at the prediction target time t+T0 on each of the prediction target locations X10 and X20, based on the traffic states in FIG. 3.

Alternatively, as long as a relationship between a current traffic state on each location and a traffic state at a prediction target time on a prediction target location can be represented, a model in a format other than Equation 1 may be used as the predictive model.

The model learning unit 120 generates a sensitivity model (step S104). Herein, the model learning unit 120 generates the sensitivity model on the distribution location, based on the distribution information.

Generally, it is considered that which of selectable paths users select on the distribution location depends on a difference of predicted traveling times and a difference of tolls between the respective paths presented to the users. For example, in FIG. 1, it is assumed that a predictive traveling time of the path R2 is shorter than a predictive traveling time of the path R1, and a toll of the path R2 is higher than a toll of the path R1. In this case, it is considered that, when a user determines that a difference of the predicted traveling times is appropriate as compared with a difference of the tolls, the user tends to select the path R2 having the shorter predicted traveling time. On the other hand, it is considered that, when a user determines that the difference of the predicted traveling times is not appropriate as compared with the difference of the tolls, the user tends to select the path R1 despite the longer predicted traveling time. In other words, it is considered that a path having a shorter predicted traveling time is selected when a difference of tolls is small as compared with a difference of predicted traveling times, whereas a path having a longer predicted traveling time is selected when the difference of the tolls is large as compared with the difference of the predicted traveling times.

In this case, the sensitivity model is represented by, for example, $$y = \alpha \Delta T + \beta \Delta P \qquad \text{[Equation 2]}$$

Herein, $\alpha$ is a coefficient representing magnitude of a relationship between a difference between predicted traveling times $\Delta T$ and a distribution ratio y. Moreover, $\beta$ is a coefficient representing magnitude of a relationship between a difference of tolls $\Delta P$ and the distribution ratio y. The model learning unit 120 calculates values of the coefficients $\alpha$ and $\beta$, for example, by performing a regression analysis on the distribution information.

For example, the model learning unit 120 generates the sensitivity model as in Equation 2 for the distribution location X100, based on the distribution information in FIG. 4.

The model learning unit 120 transmits the generated predictive model and sensitivity model to the distribution control device 200 (step S105). The distribution control device 200 saves the predictive model and the sensitivity model in the model storage unit 240.

Note that, herein, for simplification, a single kind of model is used as each of the predictive model and the sensitivity model, but different predictive models or sensitivity models may be used for respective patterns related to a weather, a day of week, or the like.

<Distribution Control Processing>

Next, distribution control processing by the distribution control device 200 is described.

Figure 11:
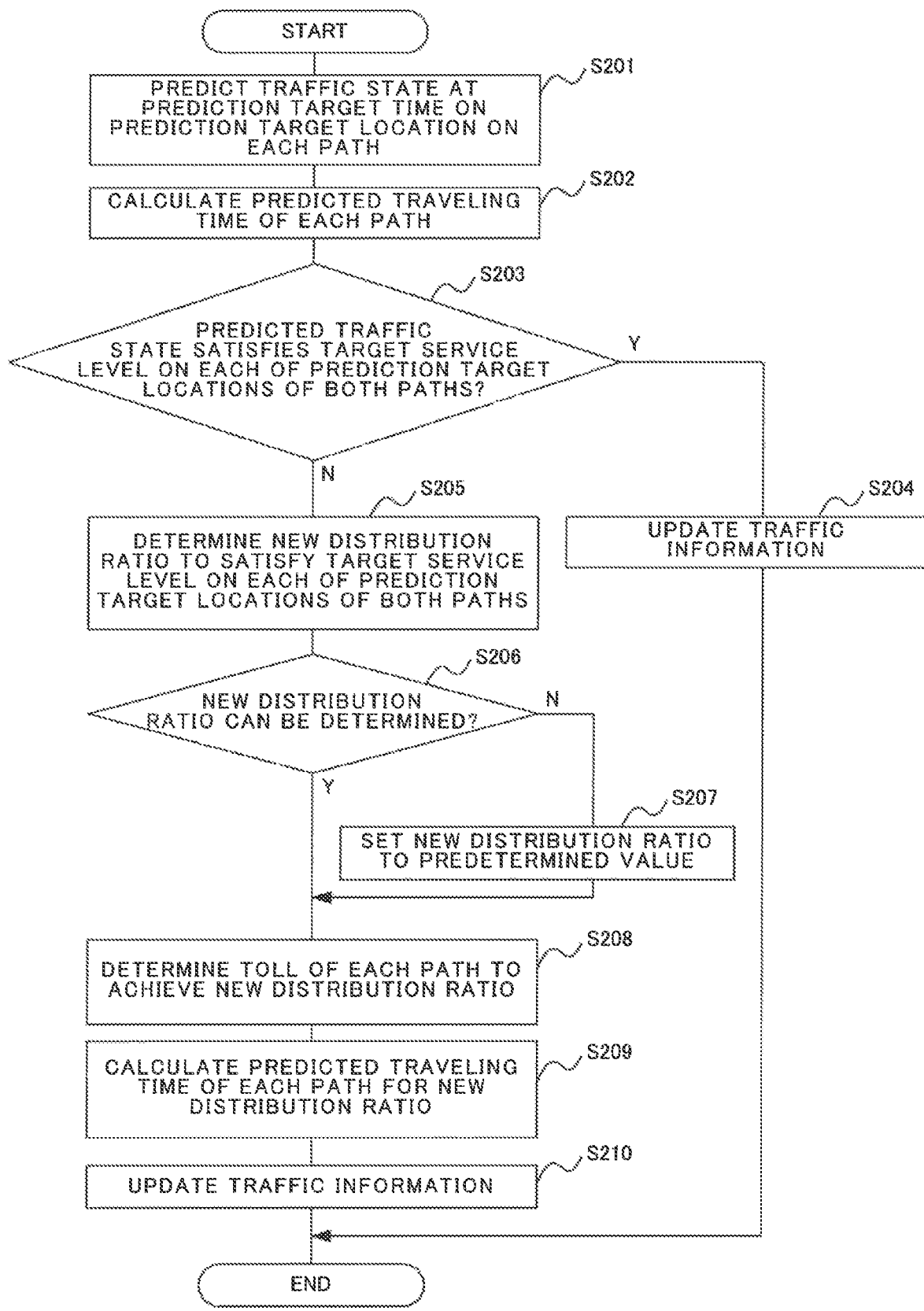
FIG. 11 is a flowchart illustrating distribution control processing in the first example embodiment.

FIG. 11 is a flowchart illustrating the distribution control processing in the first example embodiment. The distribution control processing is regularly executed at a predetermined time interval.

Herein, it is assumed that target service levels in FIG. 7 are stored in the service level storage unit 250.

First, the prediction unit 210 predicts a traffic state at the prediction target time on the prediction target location on each path (step S201). Herein, the prediction unit 210 applies a current traffic state on each location acquired from the traffic state collecting device to the predictive model, and calculates a predicted traffic state.

For example, the prediction unit 210 calculates predicted speeds $V'_{10,t+T0}$ and $V'_{20,t+T0}$ at the prediction target time $t+T0$ on the prediction target locations X10 and X20 by use of the predictive model.

The control unit 230 calculates a predicted traveling time of each path, based on the predicted traffic state (step S202).

For example, the control unit 230 calculates predicted traveling times TR1 and TR2 of the paths R1 and R2, based on the predicted speeds $V'_{10,t+T0}$ and $V'_{20,t+T0}$ on the prediction target locations X10 and X20.

The determination unit 220 determines whether or not the predicted traffic state satisfies the target service level on each of the prediction target locations of both paths (step S203).

For example, the determination unit 220 determines whether or not the predicted speeds $V'_{10,t+T0}$ and $V'_{20,t+T0}$ satisfy the minimum speed (50 km/h) set as the target service levels SL10 and SL20 on the prediction target locations X10 and X20 in FIG. 7, respectively.

When the target service level is satisfied on each of the prediction target locations of both paths (step S203/Y), the control unit 230 updates the traffic information with the predicted traveling times calculated in the step S202 (step S204). The control unit 230 transmits the updated traffic information to the output device 300, and causes the output device 300 to output the updated traffic information.

For example, when the predicted speeds $V'_{10,t+T0}$ and $V'_{20,t+T0}$ satisfy the target service levels SL10 and SL20, respectively, the control unit 230 updates the traffic information with the predicted traveling times TR1 and TR2 of the paths R1 and R2.

On the other hand, when there is a path for which the target service level is not satisfied (step S203/N), the control unit 230 determines a new distribution ratio to satisfy the target service level on each of the prediction target locations of both paths (step S205). Herein, the control unit 230 calculates the distribution ratio by setting the service level on the prediction target location on the path for which the target service level is not satisfied to the target service level. Then, the control unit 230 determines whether or not the traffic state on the prediction target location of another path satisfies the target service level with the calculated distribution ratio. When the target service level is satisfied, the control unit 230 determines the calculated distribution ratio as a new distribution ratio.

For example, when the predicted speed $V'_{10,t+T0}$ does not satisfy the target service level SL10, the control unit 230 sets the speed on the location X10 to the minimum speed set as the target service level SL10. The control unit 230 acquires a flow rate corresponding to the minimum speed (a flow rate of the path R1), by use of the correlation on the location X10. Then, the control unit 230 calculates, as the new distribution ratio on the distribution location X100, a ratio of the acquired flow rate of the path R1 to a total value of current flow rates of the paths R1 and R2 on the distribution location X100. Further, the control unit 230 calculates a flow rate of the path R2 from the total value of the current flow rates of the paths R1 and R2 on the distribution location X100 and the calculated new distribution ratio, and acquires a speed corresponding to the flow rate by use of the correlation on the location X20. Then, the control unit 230 determines whether or not the acquired speed on the location X20 satisfies the minimum speed set as the target service level SL20.

When the new distribution ratio can be determined (step S206/Y), the distribution control processing proceeds to processing from step S208.

On the other hand, when the new distribution ratio cannot be determined (step S206/N), the control unit 230 determines a predetermined value such as 0.5 as the new distribution ratio (step S207).

The control unit 230 determines a toll of each path to achieve the new distribution ratio determined in step S205 or step S207 (step S208). Herein, the control unit 230 calculates a difference of tolls, for the new distribution ratio determined in the step S205 or the step S207 and the difference of the predicted traveling times calculated in the step S202, for example, by use of the sensitivity model in Equation 2. Then, the control unit 230 sets a toll of each path or one path, in such a way that a difference of tolls between paths becomes the calculated difference of tolls.

For example, the control unit 230 calculates the difference of tolls by applying the new distribution ratio and the difference of the predicted traveling times TR1 and TR2 to the sensitivity model. The control unit 230 sets the tolls PR1 and PR2 of the paths R1 and R2 in accordance with the calculated difference of tolls.

Furthermore, the control unit 230 re-calculates a predicted traveling time of each path for the new distribution ratio determined in the step S205 (step S209).

For example, the control unit 230 calculates predicted traveling times TR'1 and TR'2 of the paths R1 and R2, based on a speed (minimum speed) on the location X10 and a speed (a speed calculated from the distribution ratio) on the location X20, respectively.

The control unit 230 updates the traffic information with the predicted traveling time of each path calculated in the step S209, and with the toll of each path determined in the step S208 (step S210). The control unit 230 transmits the updated traffic information to the output device 300, and causes the output device 300 to output the updated traffic information.

For example, the control unit 230 updates the traffic information with the predicted traveling times TR'1 and TR'2 of the paths R1 and R2, and the tolls PR1 and PR2.

Figure 12:
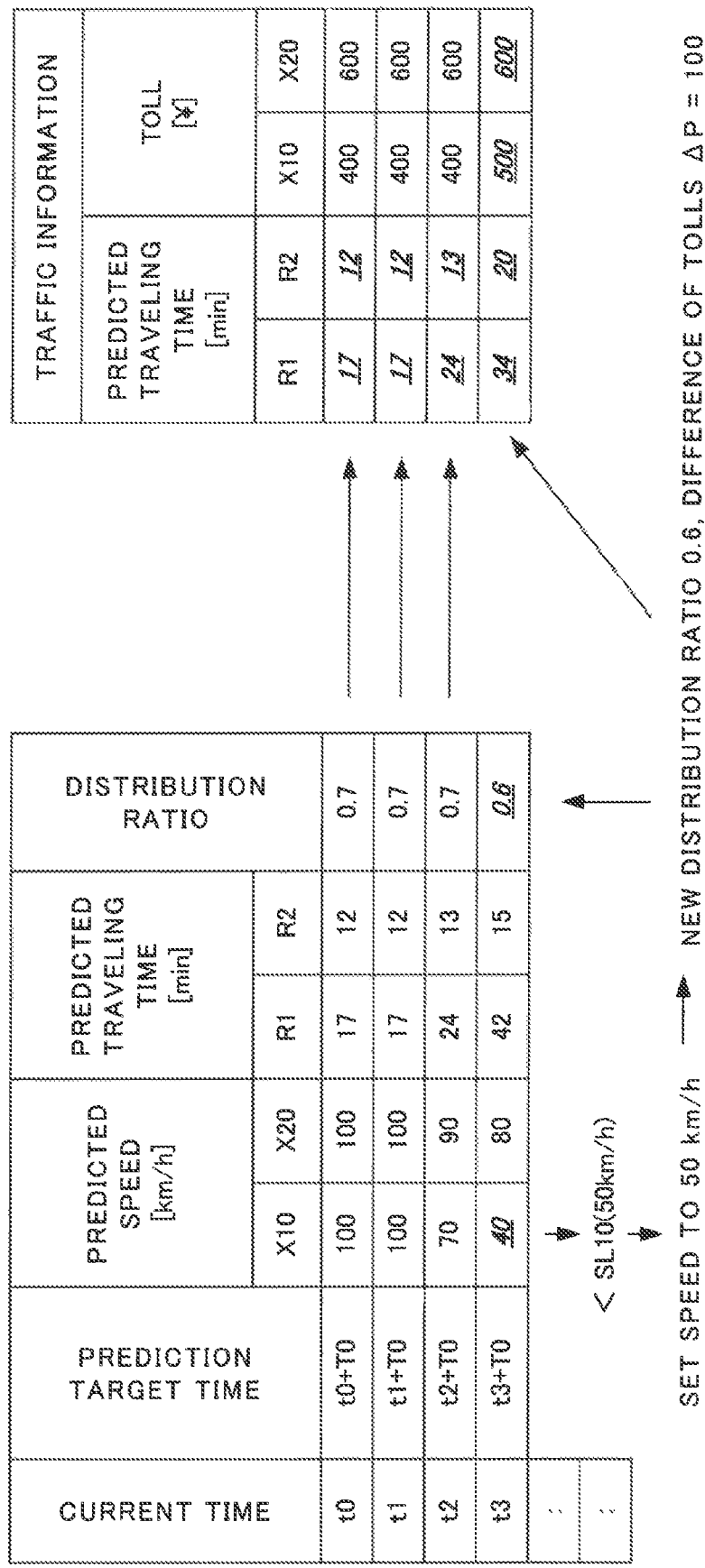
FIG. 12 is a diagram illustrating a specific example of the distribution control processing in the first example embodiment.

FIG. 12 is a diagram illustrating a specific example of the distribution control processing in the first example embodiment. In FIG. 12, predicted speeds on the locations X10 and X20, and traffic information (a predicted traveling time and a toll of each path) of the output device 300 on the location X100 are indicated for each time.

For example, predicted speeds "100 km/h" and "100 km/h" on the locations X10 and X20 for a time t0+T0 are calculated at a time t0. In this case, the predicted speeds at both locations satisfy the target service levels SL10 and SL20 (minimum speed 50 km/h). Therefore, predicted traveling times in traffic information are updated, but tolls "400 yen" and "600 yen" of the paths R1 and R2 are not changed.

Similarly, at times t1 and t2, predicted speeds satisfy the target service levels, and therefore, only the predicted traveling times are updated.

It is assumed that, at a time t3, a predicted speed on the location X10 at a time t3+T0 decreases due to increase in the number of vehicles.

In this case, a predicted speed "40 km/h" on the location X10 does not satisfy the target service level SL10. The control unit 230 calculates a new distribution ratio "0.6" in such a way that a speed on the location X10 satisfies the target service level SL10. Then, the control unit 230 calculates a speed "80 km/h" on the location X20, based on the calculated distribution ratio. Since the speed "80 km/h" on the location X20 satisfies the target service level SL20, the control unit 230 determines the new distribution ratio as "0.6". The control unit 230 calculate a difference of tolls "100 yen" for the new distribution ratio "0.6" and a difference of predicted traveling times "27 minutes". Based on the calculated difference of tolls, the control unit 230 determines tolls of the paths R1 and R2 as "500 yen" and "600 yen", respectively. Moreover, the control unit 230 calculates predicted traveling times "34 minutes" and "20 minutes" of the paths R1 and R2, based on speeds "50 km/h" and "80 km/h" on the locations X10 and X20. Then, the control unit 230 updates the traffic information with the predicted traveling times "34 minutes" and "20 minutes" and the tolls "500 yen" and "600 yen" of the paths R1 and R2.

In this way, when a predicted traffic state does not satisfy a target service level on one of selectable paths of a toll-way due to congestion, a toll of each path is set in such a way that another path is more selected. Thus, vehicles selecting a congested path decrease (vehicles selecting a non-congested path increase), and a traffic state is maintained at a target service level or more.

As described above, the operation according to the first example embodiment is completed.

Note that, in the first example embodiment, a case where the road network to be controlled has the two paths R1 and R2 as paths to arrive at the location X0 from the location X100 is described as an example. Alternatively, without being limited to this, the road network may include a plurality of three or more paths as paths to arrive at the location X0 from the location X100. In this case, the learning device 100 generates, as a sensitivity model, a model representing a distribution ratio for a difference of predicted values of indexes related to traffic states of respective paths, and a difference of tolls. When a predicted traffic state does not satisfy a target service level on at least one of the plurality of paths, the distribution control device 200 determines a distribution ratio in such a way that a traffic state on each of the plurality of paths satisfies the target service level. Then, by use of the sensitivity model, the distribution control device 200 determines a toll of each path to achieve the determined distribution ratio.

Next, an advantageous effect according to the first example embodiment is described.

According to the first example embodiment, in a toll-way having a plurality of selectable paths, it is possible to maintain service quality provided by the toll-way. A reason for this is that, a traffic state on each of the plurality of paths is predicted, and when a traffic state predicted on at least one of the plurality of paths does not satisfy a predetermined service level, the traffic control system 1 controls the distributed numbers of vehicles among a plurality of paths. Herein, the traffic control system 1 controls the distributed numbers in such a way that a traffic state on each of the plurality of paths satisfies the predetermined service level.

Furthermore, according to the first example embodiment, in a toll-way having a plurality of selectable paths, it is possible to maintain service quality provided by the toll-way with a simple configuration. A reason for this is that the traffic control system 1 determines, based on a sensitivity model, a toll of each of the plurality of paths in such a way that a traffic state on each of the plurality of paths satisfies the predetermined service level, and outputs the toll with a predicted value of an index related to the traffic state of each of the plurality of paths. Thus, it is possible to control the distributed numbers of vehicles among paths with a simple configuration which displays, to users, predicted values of the index related to the traffic state (predicted traveling times), and tolls.

Second Example Embodiment

Next, a second example embodiment is described.

First, a road network to be controlled in the second example embodiment is described.

In the second example embodiment, the road network to be controlled is a road network including a toll-way in which a passage toll is collected, and a freeway in which a passage toll is not collected, and is capable of traffic dispersion between the toll-way and the freeway.

Figure 13:
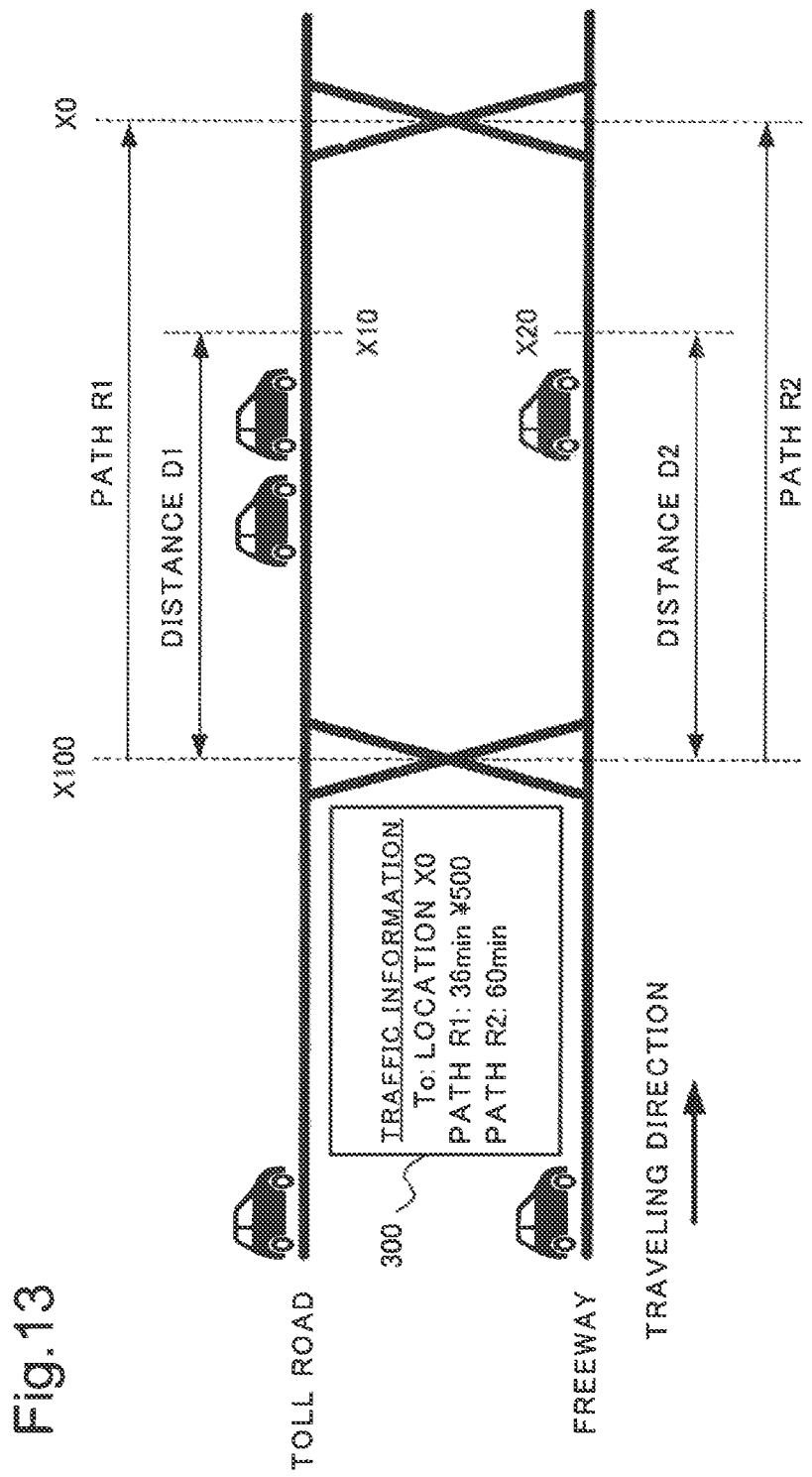
FIG. 13 is a diagram illustrating an example of a road network to be control in a second example embodiment.

FIG. 13 is a diagram illustrating an example of the road network to be controlled in the second example embodiment. On a location X100, a toll-way (path R1) or a freeway (path R2) is selectable as a path to arrive at a location X0.

In the second example embodiment, a distribution ratio on the distribution location (location X100) is controlled in such a way that toll revenue of the toll-way (path R1) is maximized while a target service level is maintained in the toll-way. In the second example embodiment, the distribution ratio is controlled by changing a toll of the toll-way (path R1) (a difference of tolls between paths).

Next, a configuration according to the second example embodiment is described. A block diagram illustrating the configuration of the traffic control system 1 in the second example embodiment is similar to that in the first example embodiment (FIG. 2).

The distribution information storage unit 150 of the learning device 100 stores distribution information as in the first example embodiment. In the second example embodiment, a toll of the toll-way (path R1) is set as a difference of tolls of distribution information.

FIG. 14 is a diagram illustrating an example of the distribution information in the second example embodiment. In the example of FIG. 14, a difference of predicted traveling times $\Delta T$, a difference of tolls $\Delta P$ (a toll PR1 of the toll-way (path R1)), and a distribution ratio y are collected as distribution information for the distribution location X100.

The service level storage unit 250 of the distribution control device 200 stores a target service level for each location on the toll-way (path R1).

FIG. 15 is a diagram illustrating an example of the target service level in the second example embodiment. In the example of FIG. 15, SL10 (minimum speed 80 km/h) is set as the target service level on a location X10.

The determination unit 220 determines whether or not a predicted traffic state satisfies the target service level stored in the service level storage unit 250 on the prediction target location on the toll-way (path R1).

When the target service level is not satisfied as a result of the determination, the control unit 230 determines a distribution ratio to satisfy the target service level on the prediction target location on the toll-way (path R1). Moreover, the control unit 230 determines a toll of the toll-way (path R1) to achieve the determined distribution ratio, by use of the sensitivity model. Further, when the target service level is satisfied as a result of the determination, the control unit 230 determines the distribution ratio and the toll by use of the sensitivity model in such a way that a total of toll revenues of the toll-way (path R1) is maximized.

Next, the operation according to the second example embodiment is described.

<Learning Processing>

First, learning processing by the learning device 100 is described.

A flowchart illustrating learning processing in the second example embodiment is similar to that in the first example embodiment (FIG. 10).

Herein, it is assumed that the road information of the road network in FIG. 13 is stored in the road information storage unit 130. It is also assumed that the distribution information in FIG. 14 is stored in the distribution information storage unit 150.

For example, the prediction target determination unit 110 determines the locations X10 and X20 on the toll-way (path R1) and the freeway (path R2) in FIG. 13 as prediction target locations. The prediction target determination unit 110 calculates an arrival time T0 from the distribution location X100 to the prediction target locations X10 and X20, and determines "a time when the time T0 has elapsed from the current time" as a prediction target time. The model learning unit 120 generates a predictive model as in Equation 1, for a vehicle speed at a prediction target time t+T0 on the prediction target locations X10 and X20. The model learning unit 120 generates a sensitivity model as in Equation 2 for the distribution location X100, based on the distribution information in FIG. 14.

<Distribution Control Processing>

Next, distribution control processing by the distribution control device 200 is described.

Figure 16:
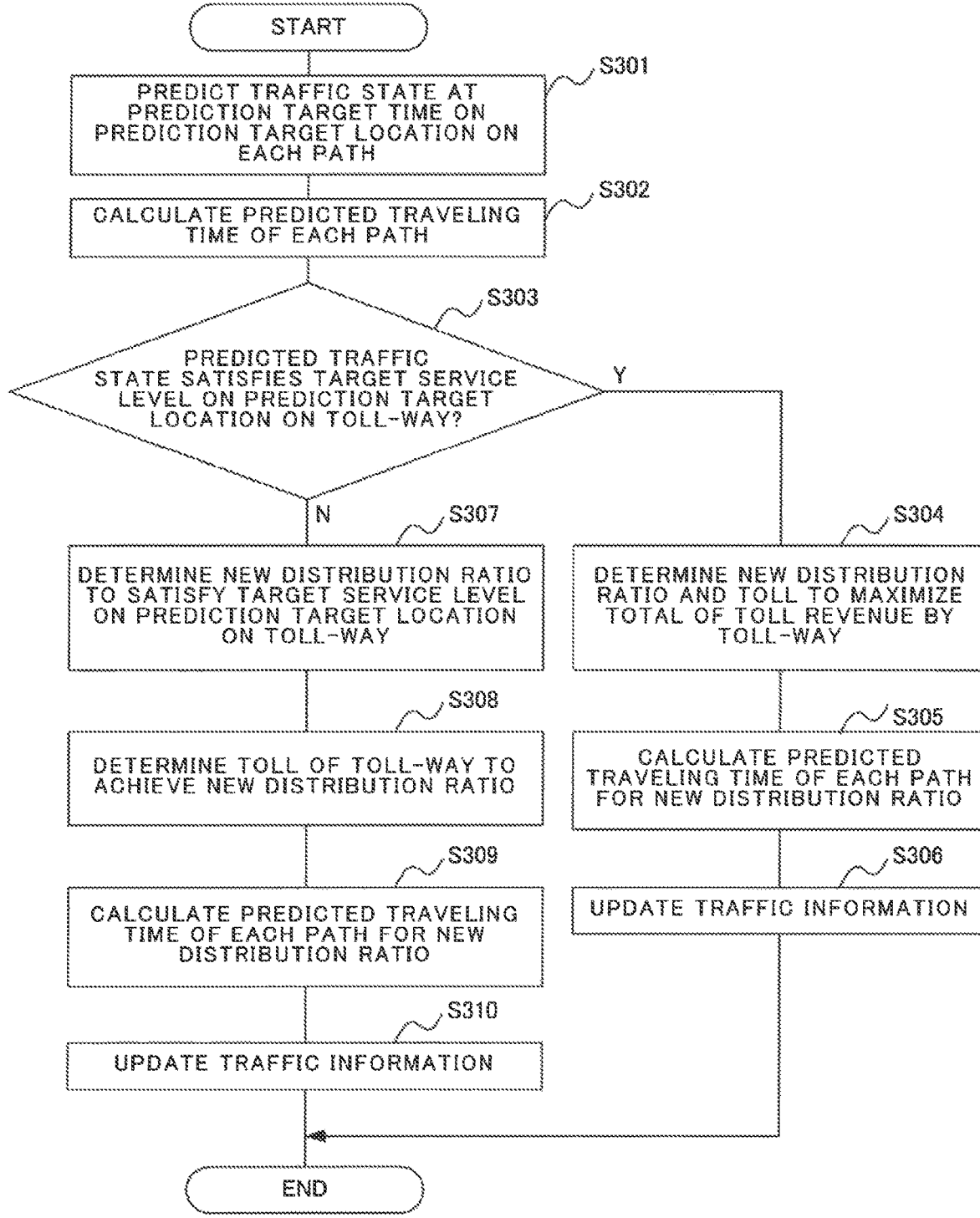
FIG. 16 is a flowchart illustrating distribution control processing in the second example embodiment.

FIG. 16 is a flowchart illustrating distribution control processing in the second example embodiment.

Herein, it is assumed that the target service level in FIG. 15 is stored in the service level storage unit 250.

First, the prediction unit 210 predicts a traffic state at the prediction target time on the prediction target location on each path (step S301).

For example, the prediction unit 210 calculates predicted speeds $V'_{10,t+T0}$ and $V'_{20,t+T0}$ at the prediction target time t+T0 on the prediction target locations X10 and X20 by use of the predictive model.

The control unit 230 calculates a predicted traveling time of each path, based on the predicted traffic state (step S302).

For example, the control unit 230 calculates predicted traveling times TR1 and TR2 of the toll-way (path R1) and the freeway (path R2), based on the predicted speeds $V'_{10,t+T0}$ and $V'_{20,t+T0}$ on the prediction target locations X10 and X20.

The determination unit 220 determines whether or not the predicted traffic state satisfies the target service level on the prediction target location on the toll-way (path R1) (step S303).

For example, the determination unit 220 determines whether or not the predicted speed $V'_{10,t+T0}$ satisfies the minimum speed (80 km/h) set as the target service level SL10 on the prediction target location X10 in FIG. 15.

When the target service level is satisfied (step S303/Y), the control unit 230 performs the following processing. The control unit 230 determines a new distribution ratio and a toll to maximize a total of toll revenues by the toll-way (path R1) while satisfying the target service level (step S304). Herein, the control unit 230 calculates the new distribution ratio and the difference of tolls by use of, for example, the sensitivity model in Equation 2, and Equation 3 and Equation 4.

$$R\text{total}=\max N1 \times \Delta P \quad \text{[Equation 3]}$$

$$y=N1/(N\text{total}) \quad \text{[Equation 4]}$$

Herein, Rtotal is a total value of toll revenues by the toll-way (path R1), N1 is a flow rate of the toll-way (path R1) on the distribution location, and Ntotal is a total value of the flow rate of the toll-way (path R1) and a flow rate of the freeway (path R2) on the distribution location. A difference of predicted traveling times in the sensitivity model in Equation 2 is set to the difference of the predicted traveling times calculated in the step S302. As an upper limit value of the flow rate N1 of the toll-way (path R1), a value with which a traffic state on the prediction target location on the toll-way (path R1) satisfies the target service level is given. As the total value Ntotal of the flow rates in Equation 4, a flow rate indicated by a current traffic state on the distribution location is used. Further, an upper limit value and a lower limit value of the toll (difference of tolls) of the toll-way (path R1) may be given. The control unit 230 sets the toll of the toll-way to the calculated difference of tolls.

For example, when the predicted speed $V'_{10,t+T0}$ satisfies the target service level SL10, the control unit 230 acquires a flow rate corresponding to the minimum speed set as the target service level SL10 (an upper limit value of the flow rate of the toll-way (path R1)), by use of the correlation of the location X10. The control unit 230 calculates the new distribution ratio and the difference of tolls by use of a difference of the predicted traveling times TR1 and TR2 of the toll-way (path R1) and the freeway (path R2), the total value of the current flow rates on the location X100, and the upper limit value of the flow rate of the toll-way (path R1). The control unit 230 updates the toll PR1 of the toll-way (path R1) with the calculated difference of tolls.

Furthermore, the control unit 230 re-calculates a predicted traveling time of each path for the new distribution ratio determined in the step S304 (step S305).

For example, the control unit 230 calculates flow rates of the toll-way (path R1) and the freeway (path R2) from the current flow rate on the distribution location X100 and the calculated new distribution ratio, and sets flow rates on the locations X10 and X20 to the calculated flow rates. The control unit 230 acquires speeds corresponding to the flow rates on the locations X10 and X20 by use of the correlations on the locations X10 and X20, and, based on the obtained speeds, calculates predicted traveling times TR'1 and TR'2 of the toll-way (path R1) and the freeway (path R2), respectively.

The control unit 230 updates the traffic information with the predicted traveling time of each path calculated in the step S305, and with the toll of the toll-way (path R1) determined in the step S304 (step S306). The control unit 230 transmits the updated traffic information to the output device 300, and causes the output device 300 to output the updated traffic information.

For example, the control unit 230 updates the traffic information with the predicted traveling times TR'1 and TR'2 of the toll-way (path R1) and the freeway (path R2), and the toll PR1.

On the other hand, when the target service level is not satisfied (step S303/N), the control unit 230 determines a new distribution ratio to satisfy the target service level on the prediction target location on the toll-way (path R1) (step S307). Herein, the control unit 230 determines, as the new distribution ratio, a distribution ratio obtained by setting the service level on the prediction target location on the toll-way (path R1) to the target service level.

For example, when the predicted speed $V'_{10,t+T0}$ does not satisfy the target service level SL10, the control unit 230 sets the speed on the location X10 to the minimum speed set as the target service level SL10. The control unit 230 obtains a flow rate (a flow rate of the toll-way (path R1)) corresponding to the minimum speed, by use of the correlation on the location X10. Then, the control unit 230 calculates, as the new distribution ratio on the distribution location X100, a ratio of the obtained flow rate of the toll-way (path R1) to the total value of the current flow rates of the toll-way (path R1) and the freeway (path R2) on the distribution location X100.

The control unit 230 determines a toll of the toll-way (path R1) to achieve the new distribution ratio determined in the step S307 (step S308). Herein, the control unit 230 calculates a difference of tolls for the new distribution ratio determined in the step S307 and the difference of the predicted traveling times calculated in the step S302, for example, by use of the sensitivity model in Equation 2. Then, the control unit 230 sets the toll of the toll-way (path R1) to the calculated difference of tolls.

For example, the control unit 230 calculates the difference of tolls by applying the new distribution ratio and the difference of the predicted traveling times TR1 and TR2 to the sensitivity model, and sets the toll PR1 of the toll-way (path R1) to the difference of tolls.

Furthermore, the control unit 230 re-calculates a predicted traveling time of each path for the new distribution ratio determined in the step S307 (step S309).

For example, the control unit 230 calculates a flow rate of the path R2 from the total value of the current flow rates of the toll-way (path R1) and the freeway (path R2) on the location X100 and the calculated new distribution ratio, and obtains a speed corresponding to the flow rate by use of the correlation on the location X20. The control unit 230 calculates predicted traveling times TR'1 and TR'2 of the toll-way (path R1) and the freeway (path R2), based on the speed (minimum speed) on the location X10 and the speed (the speed calculated from the distribution ratio) on the location X20, respectively.

The control unit 230 updates the traffic information with the predicted traveling time of each path calculated in the step S309, and with the toll of the toll-way determined in the step S308 (step S310). The control unit 230 transmits the updated traffic information to the output device 300, and causes the output device 300 to output the updated traffic information.

For example, the control unit 230 updates the traffic information with the predicted traveling times TR'1 and TR'2 of the toll-way (path R1) and the freeway (path R2), and the toll PR1.

Figure 17:
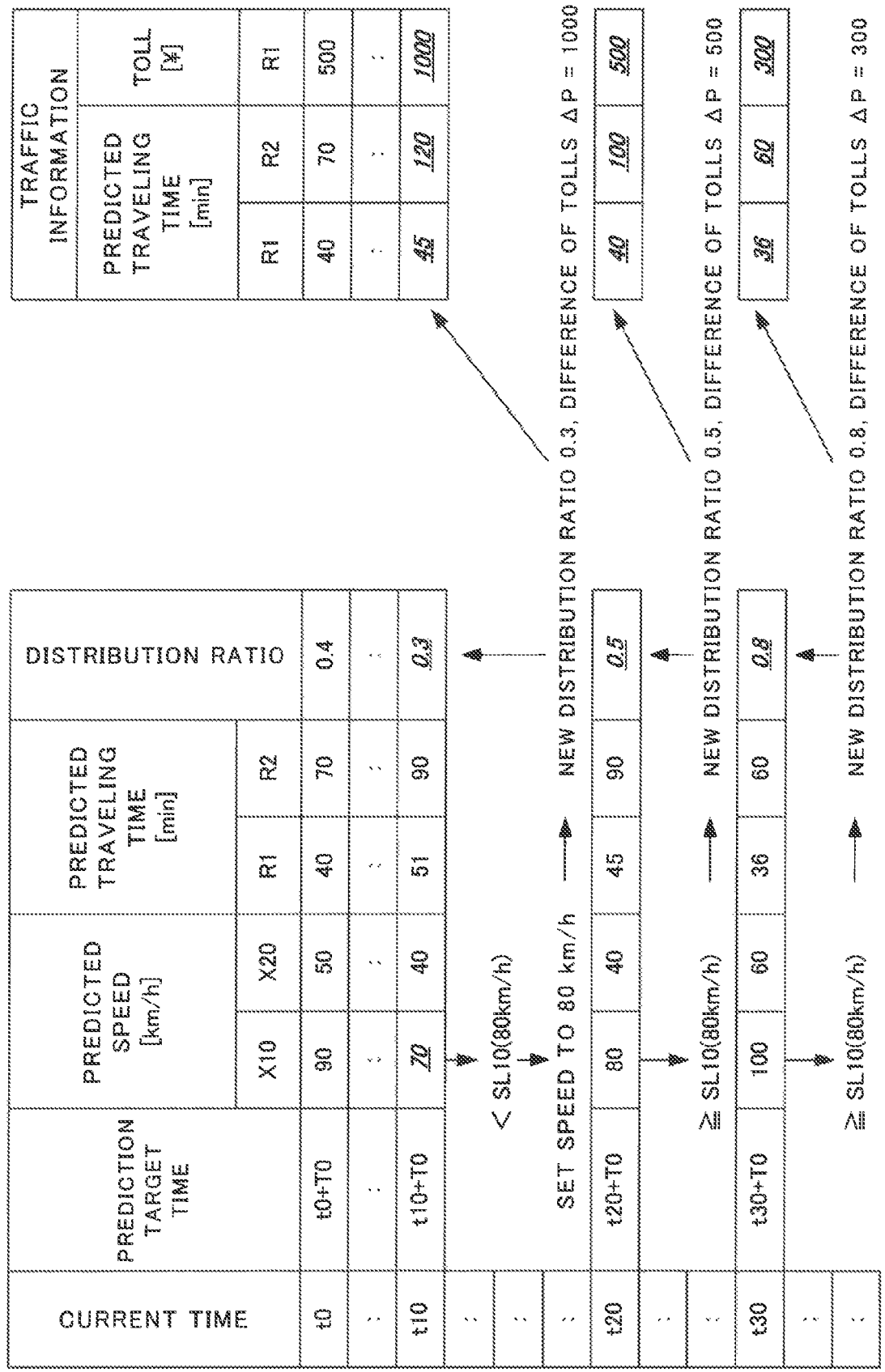
FIG. 17 is a diagram illustrating a specific example of the distribution control processing in the second example embodiment.

FIG. 17 is a diagram illustrating a specific example of the distribution control processing in the second example embodiment.

Herein, it is assumed that a normal toll of the toll-way (path R1) is "500 yen".

It is assumed that, for example, at a time t10, predicted speeds on the locations X10 and X20 at a time t10+T0 decrease due to increase in the number of vehicles. In this case, a predicted speed "70 km/h" on the location X10 does not satisfy the target service level SL10 (minimum speed 80 km/h). The control unit 230 calculates a new distribution ratio "0.3" in such a way that a speed on the location X10 satisfies the target service level SL10. The control unit 230 sets a toll for the new distribution ratio "0.3" and a difference of traveling times "39 minutes" to "1000 yen" being higher than the normal toll. Based on the new distribution ratio, the control unit 230 calculates speeds "80 km/h" and "30 km/h" on the locations X10 and X20, and calculates predicted traveling times "45 minutes" and "120 minutes" of the toll-way (path R1) and th freeway (path R2). Then, the control unit 230 updates the traffic information with the predicted traveling times "45 minutes" and "120 minutes" of the toll-way (path R1) and the freeway (path R2), and the toll "1000 yen".

Moreover, it is assumed that, at a time t20, a predicted speed on the location X10 at a time t20+T0 increases due to decrease in the number of vehicles. In this case, a predicted speed "80 km/h" on the location X10 satisfies the target service level SL10. The control unit 230 determines a new distribution ratio "0.5" for a difference of traveling times "45 minutes" and a toll "500 yen" being the normal toll, in such a way that a speed on the location X10 satisfies the target service level SL10 and toll revenue is maximized (step S304). Based on the new distribution ratio, the control unit 230 calculates speeds "90 km/h" and "35 km/h" on the locations X10 and X20, and calculates predicted traveling times "40 minutes" and "100 minutes" of the toll-way (path R1) and the freeway (path R2). Then, the control unit 230 updates the traffic information with the predicted traveling times "40 minutes" and "100 minutes" of the toll-way (path R1) and the freeway (path R2), and the toll "500 yen".

Furthermore, it is assumed that, at a time t30, predicted speeds on the locations X10 and X20 at a time t30+T0 increase due to further decrease in the number of vehicles. In this case, a predicted speed "100 km/h" on the location X10 satisfies the target service level SL10. The control unit 230 determines a new distribution ratio "0.8" for a difference of traveling times "24 minutes" and a toll "300 yen" being lower than the normal toll, in such a way that a speed on the location X10 satisfies the target service level SL10 and the toll revenue is maximized. Based on the new distribution ratio, the control unit 230 calculates speeds "100 km/h" and "60 km/h" on the locations X10 and X20, and calculates predicted traveling times "36 minutes" and "60 minutes" of the toll-way (path R1) and the freeway (path R2). Then, the control unit 230 updates the traffic information with the predicted traveling times "36 minutes" and "60 minutes" of the toll-way (path R1) and the freeway (path R2), and the toll "300 yen".

FIG. 18 is a diagram illustrating a characteristic of toll setting of the toll-way by the distribution control processing in the second example embodiment.

For example, when a predicted traffic state of the toll-way does not satisfy the target service level due to congestion of the toll-way as in a case of the time t10 in the specific example of FIG. 17, a toll of the toll-way is raised from a normal toll regardless of a condition of the freeway. Thus, vehicles selecting the congested toll-way decrease, and the target service level of the toll-way is maintained.

Moreover, when the freeway is congested but the congestion of the toll-way is removed as in a case of the time t20, the toll of the toll-way is set to a toll near the normal toll. Thus, the number of vehicles selecting the toll-way is controlled in such a way that the target service level is maintained and toll revenue is maximized.

Furthermore, when the congestion is eliminated on both the toll-way and the freeway as in a case of the time t30, the toll of the toll-way is reduced from the normal toll. Thus, vehicles selecting the toll-way increase, and the target service level of the toll-way is maintained, and maximization of the toll revenue is also maintained.

Note that, the toll of the toll-way is raised or reduced based on the normal toll, in the example described above. However, generally, raise of the toll of the toll-way is likely to be unaccepted by users. Therefore, the normal toll may be set to the upper limit of the toll, and the toll may be changed by reducing from the normal toll.

As described above, the operation according to the second example embodiment is completed.

Note that, in the second example embodiment, a case where the road network to be controlled has two paths being the toll-way (path R1) and the freeway (path R2) as paths to arrive at the location X0 from the location X100 is described as an example. Alternatively, without being limited to this, the road network may include a plurality of three or more paths including a toll-way and a freeway as paths to arrive at the location X0 from the location X100. In this case, the learning device 100 generates, as a sensitivity model, a model representing a distribution ratio for a difference of predicted values of indexes related to traffic states of respective paths, and a difference of tolls. When a predicted traffic state does not satisfy a target service level on at least one of paths of the toll-way, the distribution control device 200 determines a distribution ratio in such a way that a traffic state on each of the paths of the toll-way satisfies the target service level. Then, by use of the sensitivity model, the distribution control device 200 determines a toll of each of the paths of the toll-way to achieve the determined distribution ratio. Moreover, when the predicted traffic state satisfies the target service level on each of the paths of the toll-way, the distribution control device 200 determines, by use of the sensitivity model, a distribution ratio and a toll of each of the paths in such a way a total of toll revenues by the toll-way is maximized.

Next, an advantageous effect according to the second example embodiment is described.

According to the second example embodiment, in a road network in which a toll-way and a freeway are selectable, it is possible to maintain service quality provided by the toll-way. A reason for this is that, a traffic state on one of a plurality of paths is predicted, and when the traffic state does not satisfy a predetermined service level, the traffic control system 1 controls the distributed numbers of vehicles among the plurality of paths in such a way that the traffic state on the one path satisfies the predetermined service level.

Furthermore, according to the second example embodiment, in a road network in which a toll-way and a freeway are selectable, it is possible to maintain service quality provided by the toll-way with a simple configuration. A reason for this is that the traffic control system 1 determines, based on a sensitivity model, a toll of one path in such a way that a traffic state on the one path satisfies a predetermined service level, and outputs the toll with a predicted value of an index related to the traffic state of each of a plurality of paths. Thus, it is possible to control the distributed numbers of vehicles among paths with a simple configuration which displays, to users, predicted values of the index related to the traffic state (predicted traveling times), and tolls.

Still further, according to the second example embodiment, in a road network in which a toll-way and a freeway are selectable, it is possible to maximize toll revenue by the toll-way while maintaining service quality provided by the toll-way. A reason for this is that the traffic control system 1 determines, based on a sensitivity model, a toll of one path in such a way that a traffic state on the one path satisfies a predetermined service level, and that a value obtained by multiplying the toll of the one path by the number of vehicles distributed to the one path is maximized.

Note that, in each of the example embodiments described above, the output device 300 outputs a predicted traveling time to users as a predicted value of an index related to a traffic state of each path. Alternatively, without being limited to this, the output device 300 may output a predicted value of another index such as a predicted speed, as a predicted value of an index related to a traffic state, as long as the index is used by users to select a path.

Moreover, in each of the example embodiments described above, the prediction unit 210 predicts a traffic state for one prediction target location on a path. Alternatively, without being limited to this, the prediction unit 210 may predict a traffic state for a plurality of prediction target locations on the path. In this case, when a traffic state does not satisfy a target service level on any one of the plurality of prediction target locations on the path, the control unit 230 may determine a distribution ratio in such a way that the target service level is satisfied on all prediction target locations on the path.

Characteristic Configuration of Example Embodiments

Next, a characteristic configuration according to the example embodiments is described.

Figure 19:
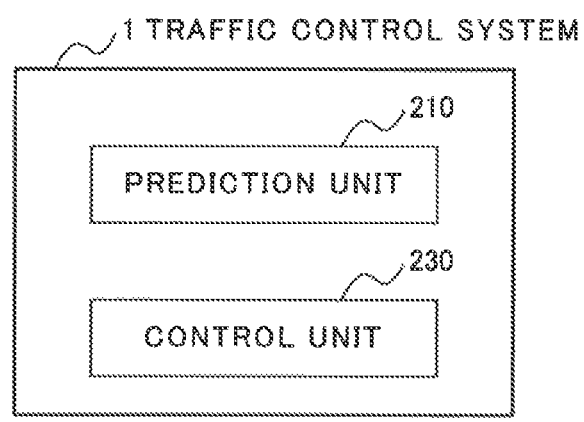
FIG. 19 is a block diagram illustrating a characteristic configuration according to the example embodiments.

FIG. 19 is a block diagram illustrating a characteristic configuration according to the example embodiments.

Referring to FIG. 19, a traffic control system 1 includes a prediction unit 210 and a control unit 230. The prediction unit 210 predicts a traffic state on one path among a plurality of paths from a first location to a second location. The control unit 230 controls, when the traffic state predicted on the one path does not satisfy a predetermined service level, distributed numbers of vehicles among the plurality of paths on the first location in such a way that the traffic state on the one path satisfies the predetermined service level.

With this characteristic configuration, it is possible to obtain an advantageous effect that service quality provided by a toll-way can be maintained.

While the invention has been particularly shown and described with reference to exemplary embodiments thereof, the present invention is not limited to these embodiments. It will be understood by those of ordinary skill in the art that various changes in form and details may be made therein without departing from the spirit and scope of the present invention as defined by the claims.

REFERENCE SIGNS LIST

1 Traffic control system
100 Learning device
101 CPU
102 Storage device

103 Input/output device
104 Communication device
110 Prediction target determination unit
120 Model learning unit
130 Road information storage unit
140 Traffic state storage unit
150 Distribution information storage unit
160 Correlation storage unit
200 Distribution control device
201 CPU
202 Storage device
203 Input/output device
204 Communication device
210 Prediction unit
220 Determination unit
230 Control unit
240 Model storage unit
250 Service level storage unit
260 Correlation storage unit
300 Output device
310 Output unit

The invention claimed is:

1. A traffic control system comprising:
a memory storing instructions; and
one or more processors configured to execute the instructions to:
predict a traffic state on one path among a plurality of paths from a first location to a second location; and
control, when the traffic state predicted on the one path does not satisfy a predetermined service level, distributed numbers of vehicles among the plurality of paths on the first location by outputting a toll and a predicted value of an index related to a traffic state of the plurality of paths in such a way that the traffic state on the one path satisfies the predetermined service level, wherein
the distributed numbers of vehicles is controlled by determining the toll of the one path in such a way that the traffic state on the one path satisfies the predetermined service level, based on a sensitivity model representing a distribution ratio among the plurality of paths on the first location to a difference of predicted values of indexes related to traffic states and a difference of tolls among the plurality of paths, and outputting the determined toll with the predicted value of the index related to a traffic state of each of the plurality of paths.

2. The traffic control system according to claim 1, wherein the toll of the one path is determined, based on a traffic state on the first location and the sensitivity model, in such a way that the traffic state on the one path satisfies the predetermined service level, and that a value acquired by multiplying the toll of the one path by a number of vehicles distributed to the one path is maximized.

3. The traffic control system according to claim 1, wherein the one or more processors are further configured to execute the instructions to:
predict a traffic state on each of the plurality of paths, and
control, when the traffic state predicted on at least one of the plurality of paths does not satisfy the predetermined service level, distributed numbers of vehicles among the plurality of paths on the first location in such a way that the traffic state on each of the plurality of paths satisfies the predetermined service level.

4. The traffic control system according to claim 1, wherein the distributed numbers is controlled by determining the toll of each of the plurality of paths in such a way that the traffic state on each of the plurality of paths satisfies the predetermined service level, based on a sensitivity model representing a distribution ratio among the plurality of paths on the first location to a difference of predicted values of indexes related to traffic states and a difference of tolls among the plurality of paths, and outputting the determined toll with the predicted value of the index related to a traffic state of each of the plurality of paths.

5. The traffic control system according to claim 1, wherein the one or more processors are further configured to execute the instructions to:
generate the sensitivity model, based on a history of the distribution ratio on the first location, and the difference of values of indexes related to traffic states and the difference of tolls among the plurality of paths.

6. The traffic control system according to claim 1, wherein the traffic state is a speed, the service level is a minimum speed, and the index related to the traffic state is a traveling time.

7. A traffic control method comprising:
predicting a traffic state on one path among a plurality of paths from a first location to a second location;
controlling, when the traffic state predicted on the one path does not satisfy a predetermined service level, distributed numbers of vehicles among the plurality of paths on the first location by outputting a toll and a predicted value of an index related to a traffic state of the plurality of paths in such a way that the traffic state on the one path satisfies the predetermined service level; and
controlling the distributed numbers of vehicles by determining the toll of the one path in such a way that the traffic state on the one path satisfies the predetermined service level, based on a sensitivity model representing a distribution ratio among the plurality of paths on the first location to a difference of predicted values of indexes related to traffic states and a difference of tolls among the plurality of paths, and outputting the determined toll with the predicted value of the index related to a traffic state of each of the plurality of paths.

8. A non-transitory computer readable storage medium recording thereon a program, causing a computer to perform a method comprising:
predicting a traffic state on one path among a plurality of paths from a first location to a second location; and
controlling, when the traffic state predicted on the one path does not satisfy a predetermined service level, distributed numbers of vehicles among the plurality of paths on the first location by outputting a toll and a predicted value of an index related to a traffic state of the plurality of paths in such a way that the traffic state on the one path satisfies the predetermined service level, wherein
the distributed numbers of vehicles is controlled by determining the toll of the one path in such a way that the traffic state on the one path satisfies the predetermined service level, based on a sensitivity model representing a distribution ratio among the plurality of paths on the first location to a difference of predicted values of indexes related to traffic states and a difference of tolls among the plurality of paths, and outputting the determined toll with the predicted value of the index related to a traffic state of each of the plurality of paths.

* * * * *